United States Patent
El-Gamal et al.

(10) Patent No.: US 9,448,069 B2
(45) Date of Patent: Sep. 20, 2016

(54) MICROELECTROMECHANICAL BULK ACOUSTIC WAVE DEVICES AND METHODS

(71) Applicant: The Royal Institution for the Advancement of Learning / McGill University, Montreal (CA)

(72) Inventors: Mourad El-Gamal, Brossard (CA); Mohannad Elsayed, Montreal (CA); Paul-Vahe Cicek, Montreal (CA); Frederic Nabki, Montreal (CA)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 381 days.

(21) Appl. No.: 14/043,075

(22) Filed: Oct. 1, 2013

(65) Prior Publication Data

US 2014/0230547 A1  Aug. 21, 2014

Related U.S. Application Data

(60) Provisional application No. 61/708,164, filed on Oct. 1, 2012.

(51) Int. Cl.
*G01C 19/56* (2012.01)
*G01C 19/5698* (2012.01)

(52) U.S. Cl.
CPC ................................ *G01C 19/5698* (2013.01)

(58) Field of Classification Search
CPC .......................... G01C 19/5698; G01C 19/567
USPC .......................................... 73/504.12, 504.13
See application file for complete search history.

(56) References Cited

U.S. PATENT DOCUMENTS 5,932,804 A  8/1999  Hopkin et al.
5,937,275 A  8/1999  Munzel et al.
(Continued)

FOREIGN PATENT DOCUMENTS

WO  2011026100 A1  3/2011

OTHER PUBLICATIONS

Mochida et al., "A micromachined vibrating rate gyroscope with independent beams for the drive and detection modes", Sensors and Actuators A: Physical, 2000, pp. 170-178, vol. 80, Elsevier.

(Continued)

*Primary Examiner* — John Chapman, Jr.
(74) *Attorney, Agent, or Firm* — The Law Office of Michael E. Kondoudis

(57) ABSTRACT

Micromachined gyroscopes, such as those based upon microelectromechanical systems (MEMS) have the potential to dominate the rate-sensor market mainly due to their small size, low power and low cost. As MEMS gyroscopes are resonant devices requiring active excitation it would be beneficial to improve the resonator Q-factor reducing the electrical drive power requirements for the excitation circuitry. Further, many prior art MEMS gyroscope designs have multiple resonances arising from design and manufacturing considerations which require additional frequency tuning and control circuitry together with the excitation/sense circuitry. It would therefore be beneficial to enhance the bandwidth of the resonators to remove the requirement for such circuitry. Further, to address the relatively large dimensions of MEMS gyroscopes it would be beneficial for the MEMS gyroscopes to be fabricated directly above the CMOS electronics thereby reducing the die dimensions and lowering per die cost.

19 Claims, 29 Drawing Sheets

(56) References Cited

U.S. PATENT DOCUMENTS

| | | | |
|---|---|---|---|
| 7,543,496 B2* | 6/2009 | Ayazi | G01C 19/5698 73/504.01 |
| 8,071,411 B2 | 12/2011 | Nabki et al. | |
| 2009/0266162 A1 | 10/2009 | Ayazi et al. | |
| 2011/0027930 A1 | 2/2011 | El-Gamal et al. | |
| 2011/0111545 A1 | 5/2011 | El-Gamal et al. | |
| 2015/0308828 A1* | 10/2015 | Jomori | G01C 19/5712 73/504.12 |

OTHER PUBLICATIONS

Geiger et al., "Decoupled microgyros and the design principle DAVED", Sensors and Actuators A: Physical, 2002, pp. 239-249, vol. 95, Elsevier.

Bae et al., "High Performance MEMS Micro-Gyroscope", Proceedings of SPIE Design, Test, Integration, and Packaging of MEMS/MOEMS 2002, 2002, pp. 316-324, vol. 4755, Society of Photo-Optical Instrumentation Engineers.

Acar et al., "An Approach for Increasing Drive-Mode Bandwidth of MEMS Vibratory Gyroscopes", Journal of Microelectromechanical Systems, Jun. 2005, pp. 520-528, vol. 14, Institute of Electrical and Electronics Engineers.

Zaman et al., "High Performance Matched-Mode Tuning Fork Gyroscope", 19th IEEE International Conference on Micro Electro Mechanical Systems (MEMS 2006), Jan. 22-26, 2006, pp. 66-69, Institute of Electrical and Electronics Engineers, Istanbul, Turkey.

Neul et al, "Micromachined Angular Rate Sensors for Automotive Applications", The 4th IEEE Conference on Sensors, 2005, pp. 527-530, Institute of Electrical and Electronics Engineers.

Ayazi, "The HARPSS Process for Fabrication of Precision MEMS Inertial Sensors", Mechatronics, 2002, pp. 1185-1199, vol. 12, Elsevier Science Ltd.

Luo et al., "Integrated Multiple-Device IMU system with Continuous-Time Sensing Circuitry", 2003 IEEE International Solid-State Circuits Conference, 2003.

Xie et al., "A CMOS-MEMS Lateral-Axis Gyroscope", The 15th IEEE International Conference on Micro Electro Mechanical Systems, 2002, pp. 162-165, Institute of Electrical and Electronics Engineers.

Johari et al., "Capacitive Bulk Acoustic Wave Silicon Disc Gyroscopes", International Electron Devices Meeting, 2006, pp. 513-516, Institute of Electrical and Electronics Engineers.

Johari, "Micromachined Capacitive Silicon Bulk Acoustic Wave Gyroscopes", PhD Thesis, Dec. 2008, Georgia Institute of Technology, USA.

Shah et al., "CMOS ASIC for MHz Silicon BAW Gyroscope", IEEE International Symposium on Circuits and Systems, 2008, pp. 2458-2461, Institute of Electrical and Electronics Engineers.

Sung et al., "A 3MHz Spoke Gyroscope with Wide Bandwidth and Large Dynamic Range", The 23rd IEEE International Conference on Micro Electro Mechanical Systems, 2010, pp. 104-107, Institute of Electrical and Electronics Engineers.

Ayazi et al., "A HARPSS Polysilicon Vibrating Ring Gyroscope", Journal of Microelectromechanical Systems, Jun. 2001, pp. 169-179, vol. 10, No. 2, Institute of Electrical and Electronics Engineers.

Zaman et al., "The Resonating Star Gyroscope: A Novel Multiple-Shell Silicon Gyroscope with Sub-5 deg/hr Allan Deviation Bias Instability", IEEE Sensors Journal, Jun. 2009, pp. 616-624, vol. 9, No. 6, Institute of Electrical and Electronics Engineers.

Elsayed et al., "A Combined Comb/Bulk Mode Gyroscope Structure for Enhanced Sensitivity", The 26th IEEE International Conference on Micro Electro Mechanical Systems, 2013, pp. 649-652, Institute of Electrical and Electronics Engineers, Taipei, Taiwan.

Clark et al., "High Q UHF Micromechanical Radial-Contour Mode Disk Resonators", Journal of Microelectromechanical Systems, Dec. 2005, pp. 1298-1310, vol. 14, No. 6, Institute of Electrical and Electronics Engineers.

Wang et al., "1.156GHz Self-Aligned Vibrating Micromechanical Disk Resonator", IEEE Transactions on Ultrasonics, Ferroelectrics, and Frequency Control, Dec. 2004, pp. 1607-1628, vol. 51, No. 12, Institute of Electrical and Electronics Engineers.

Elsayed et al., "A 2000 degree/s Dynamic Range Bulk Mode Dodecagon Gyro for a Commercial SOI Technology", IEEE International Conference on Electronics, Circuits and Systems, 2011, pp. 264-267, Institute of Electrical and Electronics Engineers.

Johari et al., "High Frequency Capacitive Disk Gyroscopes in (100) and (111) Silicon", The 20th IEEE International Conference on Micro Electro Mechanical Systems, 2007, pp. 47-50, Institute of Electrical and Electronics Engineers.

* cited by examiner

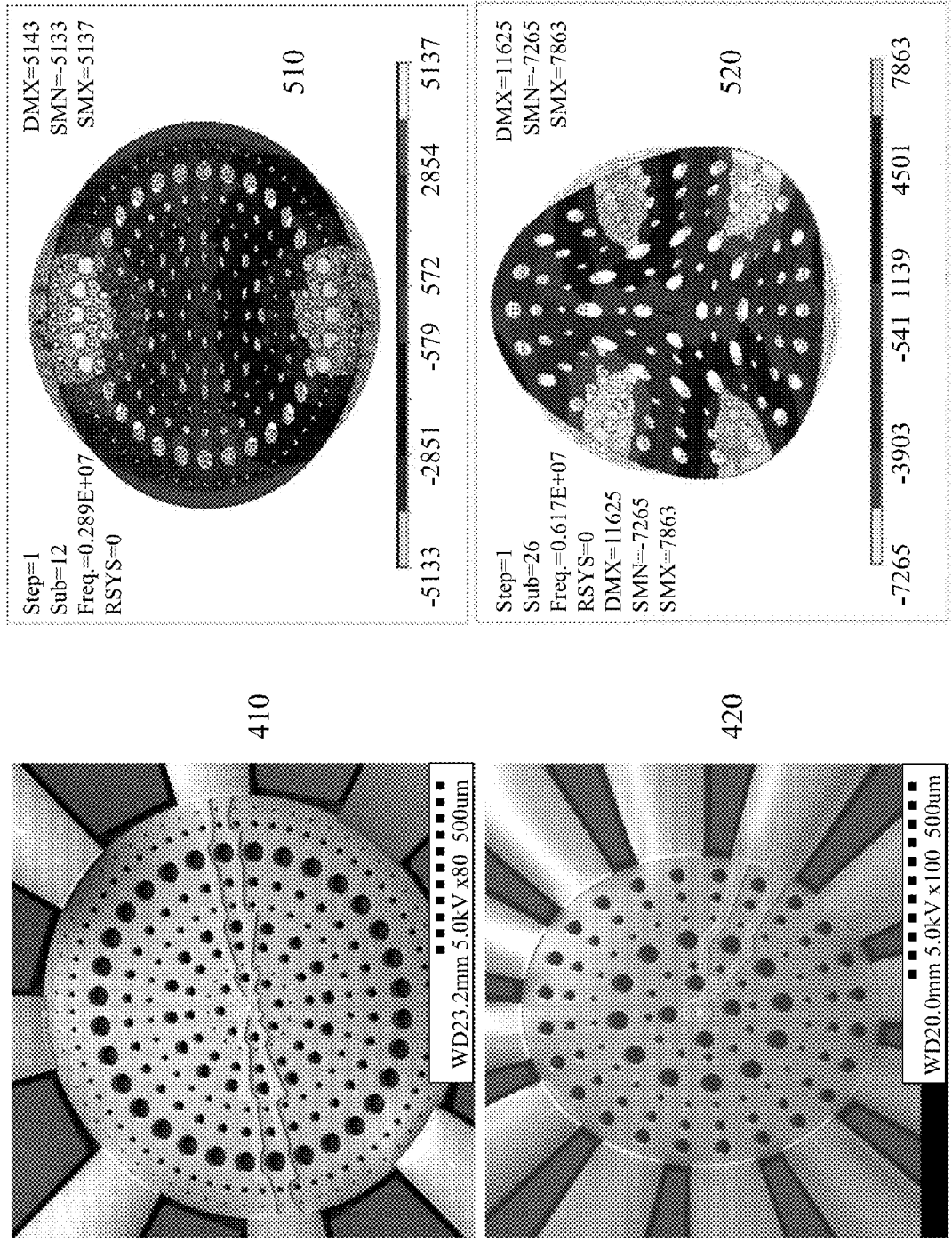

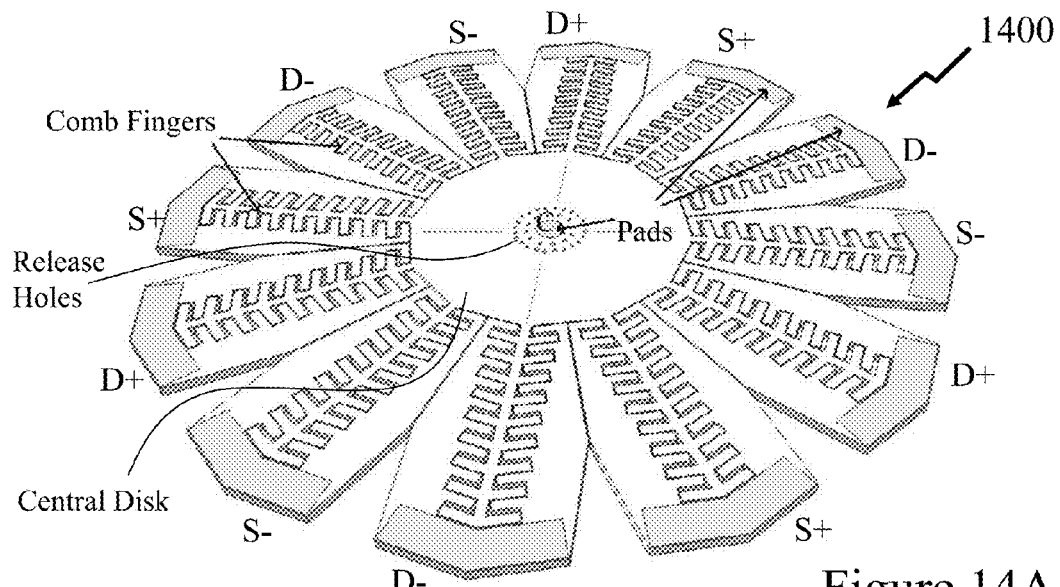
Figure 14A
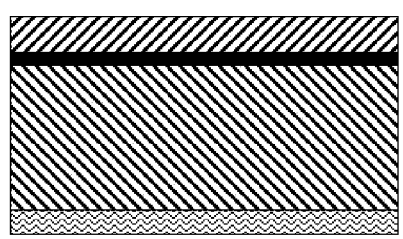 1410
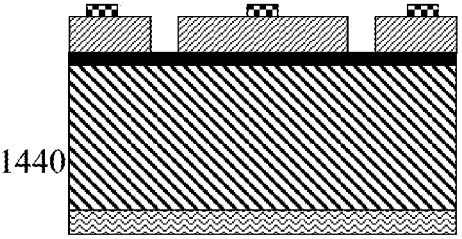 1440
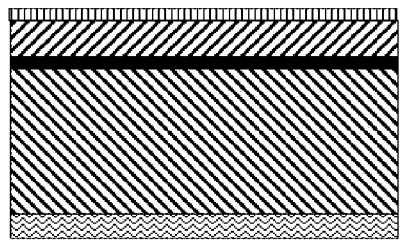 1420
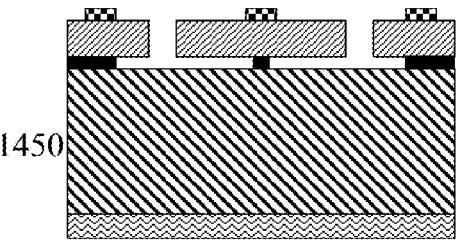 1450
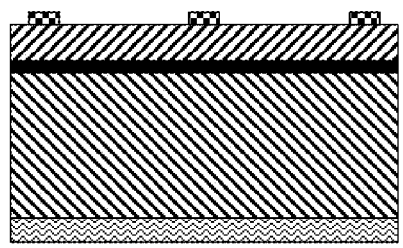 1430
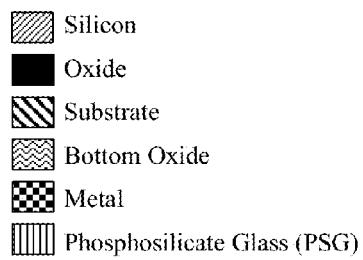
Figure 14B
- Silicon
- Oxide
- Substrate
- Bottom Oxide
- Metal
- Phosphosilicate Glass (PSG)

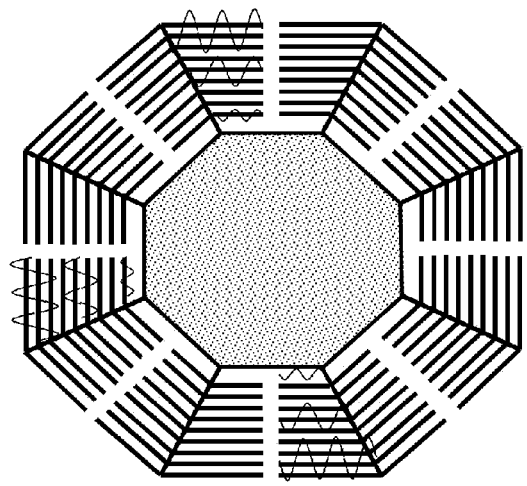
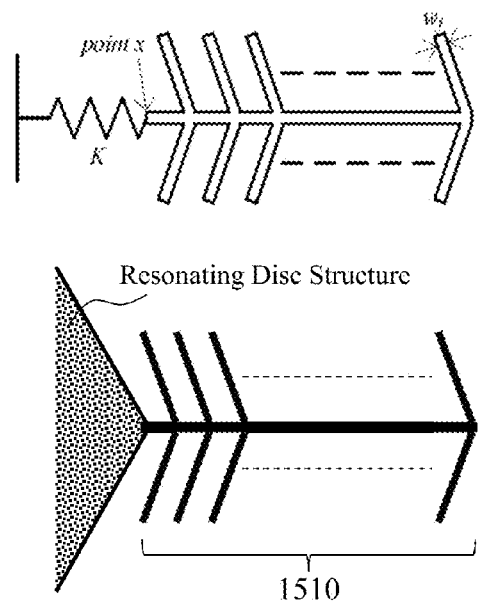
Figure 15A
Figure 15B
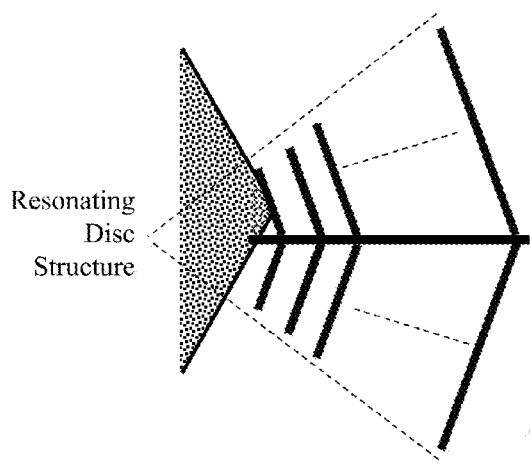
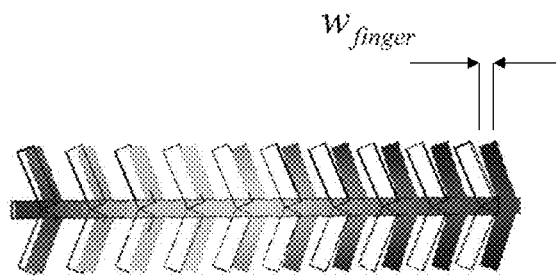
Figure 15C
Figure 15D

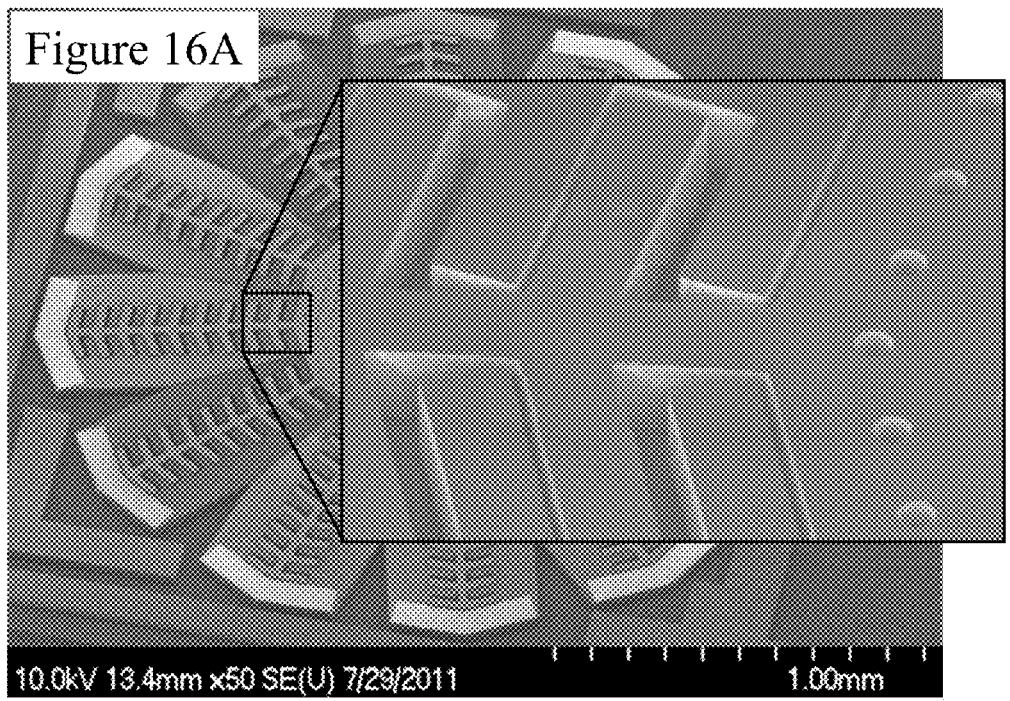
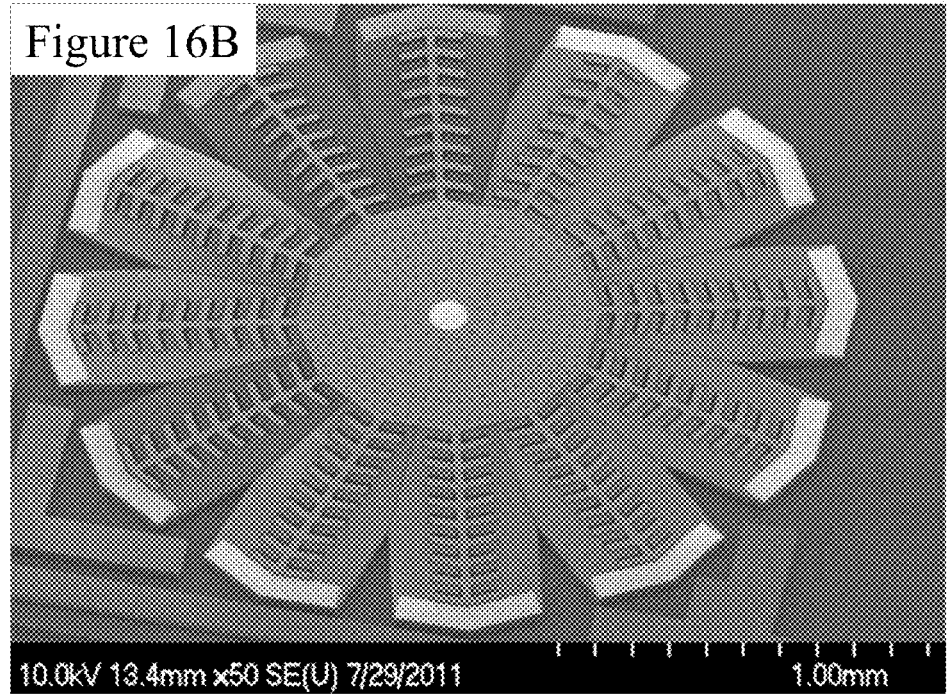

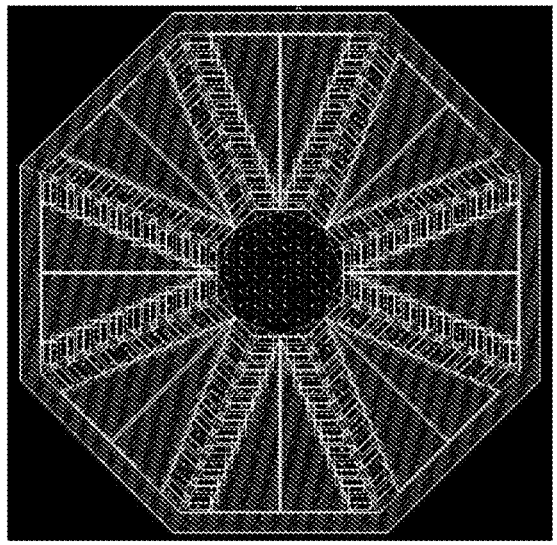
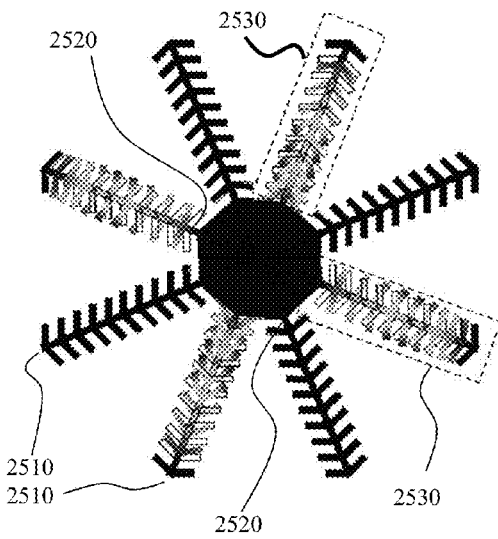
Figure 25A
Figure 25B
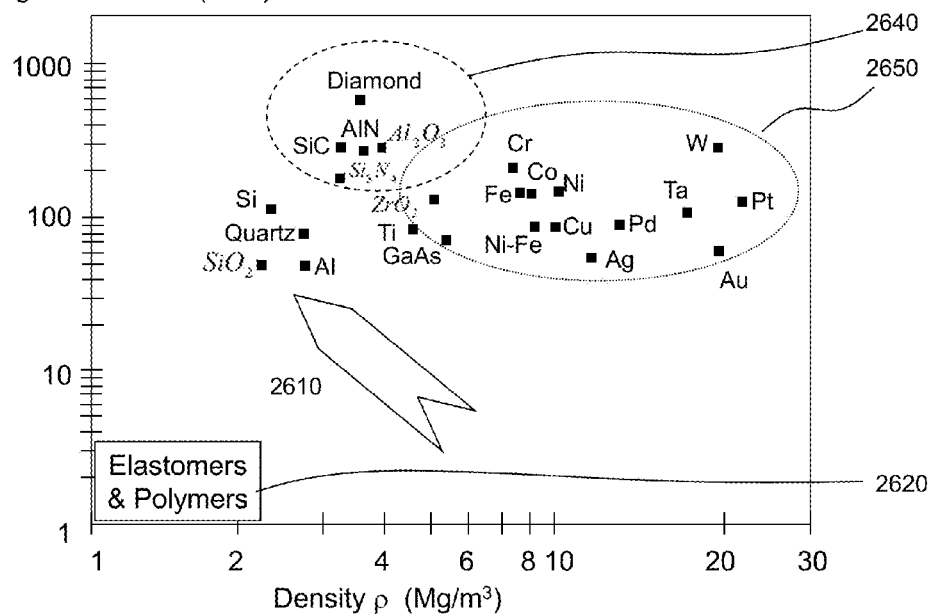
Figure 26

MICROELECTROMECHANICAL BULK ACOUSTIC WAVE DEVICES AND METHODS

CROSS-REFERENCE TO RELATED APPLICATIONS

This patent application claims the benefit of U.S. Provisional Patent Application 61/708,164 filed on Oct. 1, 2012 entitled "Microelectromechanical Bulk Acoustic Wave Devices and Methods."

FIELD OF THE INVENTION

The present invention relates to microelectromechanical devices and more particularly to novel designs and manufacturing sequences to improve electrostatic actuation and sensitivity performance for bulk acoustic wave microelectromechanical devices.

BACKGROUND OF THE INVENTION

Gyroscopes are sensors that measure the rate or angle of rotation. Micromachined gyroscopes, such as those based upon microelectromechanical systems (MEMS) have the potential to dominate the rate-sensor market mainly due to their small size, low power and low cost. At the same time these features means that the application domain for micromachined gyroscopes is quickly expanding from automotive to aerospace and consumer electronic industries, see for example Marek in "MEMS Technology—From Automotive to Consumer" (Proc. ASME Conf. on Microelectromechanical Systems, pp 59-60, 2007). Within the automotive sector multiple application exist including navigation, anti-skid, roll-over detection, next generation airbag, and anti-lock brake (ABS) systems. Micromachined gyroscopes can also be used for inertial navigation, namely the process of determining an object's position based on measurements provided by accelerometers and gyroscopes contained within an object or within a device associated with an object. An inertial measurement unit (IMU) typically uses three accelerometers and three gyroscopes oriented to gather information about an object's direction and heading. IMUs are vital components in aircraft, GPS-augmented navigation, and personal heading references, see for example Dixon et al in "Markets and Applications for MEMS Inertial Sensors" (Proc. IEEE MEMS/MOEMS Components and Their Applications III, Vol. 6113, pp 33-42, 2006).

In addition, there are numerous emerging consumer applications for micro-gyroscopes, including image stabilization in digital cameras, smart user-interfaces in handheld devices, gaming interfaces, and inertial pointing/location devices within these devices as well as smartphones, cellular telephones, PDAs etc. Further, small size, low power and low cost MEMS gyroscopes open new markets and applications such as integrated wireless/location tags for asset management and in areas like TV remote control applications, medical and industrial etc. As potential high volume consumer applications for micromachined gyroscopes continue to emerge, design and manufacturing techniques that improve their performance, shock survivability, and reliability without driving up the cost are becoming increasingly important. HIS iSuppli in March 2012 released market analysis indicating that MEMS gyroscopes in 2011 accounted for 41% of revenue for all kinds of motion sensors in consumer and mobile applications including accelerometers and electronic compasses, a market estimated at US$1.6 billion a rise from a 24% share in 2010 with an overall motion sensor revenue of approximately US$1.1 billion. In 2015 the MEMS gyroscope market is projected to reach approximately $1.1 billion alone (http://www.isuppli.com/MEMS-and-Sensors/MarketWatch/Pages/Gyroscopes-Are-Top-Earner-in-Consumer-and-Mobile-MEMS-for-2011.aspx).

Accordingly it would be beneficial against this market to provide solutions that further reduce the dimensions of the MEMS gyroscope, either directly or through removing requirements for ancillary control electronics. Such footprint reductions for discrete MEMS gyroscope die increase the number of die per wafer and hence reduce the unit cost given an essentially constant cost of fabricating a wafer with a high volume semiconductor manufacturing operation with comparable processing. In other scenarios wherein MEMS gyroscopes are integrated with control electronics and/or other electronics associated with the device within which the MEMS gyroscope is to be deployed then there is significant benefit from providing a manufacturing process for the MEMS gyroscope that is compatible with CMOS electronics.

CMOS electronics being the predominant technology for analog and digital integrated circuits in silicon due to the unparalleled benefits available from CMOS in the areas of circuit size, operating speed, energy efficiency and manufacturing costs which continue to improve from the geometric downsizing that comes with every new generation of semiconductor manufacturing processes. In respect of MEMS systems, CMOS is particularly suited as CMOS circuits dissipate power predominantly during operation and have very low static power consumption. This power consumption arising from the charging and discharging of various load capacitances within the CMOS circuits, mostly gate and wire capacitance, but also transistor drain and transistor source capacitances, whenever they are switched. Further, due to the relatively large dimensions of MEMS gyroscopes, typically hundreds of microns in diameter it would be beneficial for the MEMS gyroscope in some scenarios to be fabricated directly above the CMOS electronics rather than within a portion of the wafer adjacent to the CMOS electronics thereby reducing the die dimensions and lowering per die cost.

As MEMS gyroscopes are resonant devices requiring active excitation it would also beneficial to improve the resonator Q-factor reducing the electrical drive power requirements for the excitation circuitry. Similarly, as discussed below in the specification many MEMS gyroscope designs have multiple resonances arising from design and manufacturing considerations requiring the addition of frequency tuning and control circuitry together with the excitation/sense circuitry.

Accordingly, the inventors have addressed such issues by:
providing a novel design for bulk acoustic wave (BAW) MEMS gyroscopes that increases the vibration amplitude and provide increased sensitivity through electrostatic actuation combs;
providing novel BAW MEMS gyroscope designs with actuation electrodes within the central disc structure thereby increasing electrostatic drive and thus vibration amplitude and sensitivity;
providing BAW MEMS gyroscopes that can be fabricated directly above the CMOS electronics using low temperature BAW MEMS processing;
providing BAW MEMS fabrication processes allowing alternative materials to be employed with compatibility to low temperature processing;

providing compatibility to localized hermetic sealing methodologies for the MEMS gyroscope thereby easing packaging complexity of the MEMS-CMOS circuit;

providing novel BAW MEMS gyroscope designs eliminating release post-processing requirements;

providing BAW MEMS gyroscope designs that reduce the requirements for electronic frequency tuning; and providing a BAW MEMS gyroscope with a novel side suspension scheme removing the requirement for the centre mounting of prior art BAW MEMS gyroscopes.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to provide improvements over the prior art in respect of bulk acoustic wave gyroscopes and more particularly to novel designs and manufacturing sequences for said bulk acoustic wave gyroscopes.

In accordance with an embodiment of the invention there is provided a device comprising a substrate, a central vibratory element, and at least one electrostatic comb structure of a plurality of electrostatic comb structures, each electrostatic comb structure anchored at one end to a predetermined portion of the central vibratory element and anchored at a second distal end to an electrode fabricated on the substrate and comprising a plurality of fingers, wherein a first predetermined portion of the electrostatic comb structures comprise a predetermined portion of an excitation element to resonate the central vibratory element and a second predetermined portion of the electrostatic comb structures act comprise a predetermined portion of a sensing element generating an output electrical signal in dependence upon the resonance of the central vibratory element.

In accordance with an embodiment of the invention there is provided a device comprising a substrate and a resonator comprising a first predetermined portion comprising a ring oscillating in at least one bulk acoustic mode and a second predetermined portion within the ring oscillating in at least one flexural mode and comprising at least a plurality of radial spokes from a central element to the ring. The device further comprising a plurality of capacitively coupled structures disposed in predetermined locations around the resonator, a first subset of the capacitively coupled structures receiving drive signals to excite the resonator into resonance and a second subset of the capacitively coupled structures to generate sense signals in response to motion of the resonator relative to the capacitively coupled structures.

In accordance with an embodiment of the invention there is provided a device comprising a central mounting element, a resonator disc supported by the central mounting element and comprising a dodecagonal disc, a contact pad on the upper surface of the resonator disc, and a plurality of capacitively coupled structures disposed in predetermined locations around the resonator, a first subset of the capacitively coupled structures receiving drive signals to excite the resonator into resonance and a second subset of the capacitively coupled structures to generate sense signals in response to motion of the resonator disc relative to the capacitively coupled structures.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 4 depicts 8 and 12 electrode BAW MEMS gyroscopes according to the prior art;

FIG. 5 depicts the first and second modes of a BAW MEMS gyroscope according to an embodiment of the invention;

FIG. 14A a schematic of a disk-comb BAW gyroscope design according to an embodiment of other invention;

FIG. 14B is a simplified processing flow sequence for a disk-comb BAW gyroscope design according to an embodiment of other invention using commercial SOIMUMPs;

FIGS. 15A and 15B depict a BAW MEMS gyroscope with variable gap comb structures according to an embodiment of the invention;

FIG. 15C to 15D depict modifications to a comb based coupling for a BAW MEMS gyroscope according to an embodiment of the invention;

FIGS. 16A and 16B depict a fabricated BAW MEMS gyroscope according to an embodiment of the invention exploiting modified comb based coupling as described in FIGS. 15B and 15D;

FIG. 25A depicts a mask design for a side suspension scheme for a BAW MEMS gyroscope according to an embodiment of the invention;

FIG. 25B depicts the mode shape for a side suspension BAW MEMS gyroscope according to an embodiment of the invention;

FIG. 26 depicts a material selection chart for materials;

DETAILED DESCRIPTION

Figure 1:
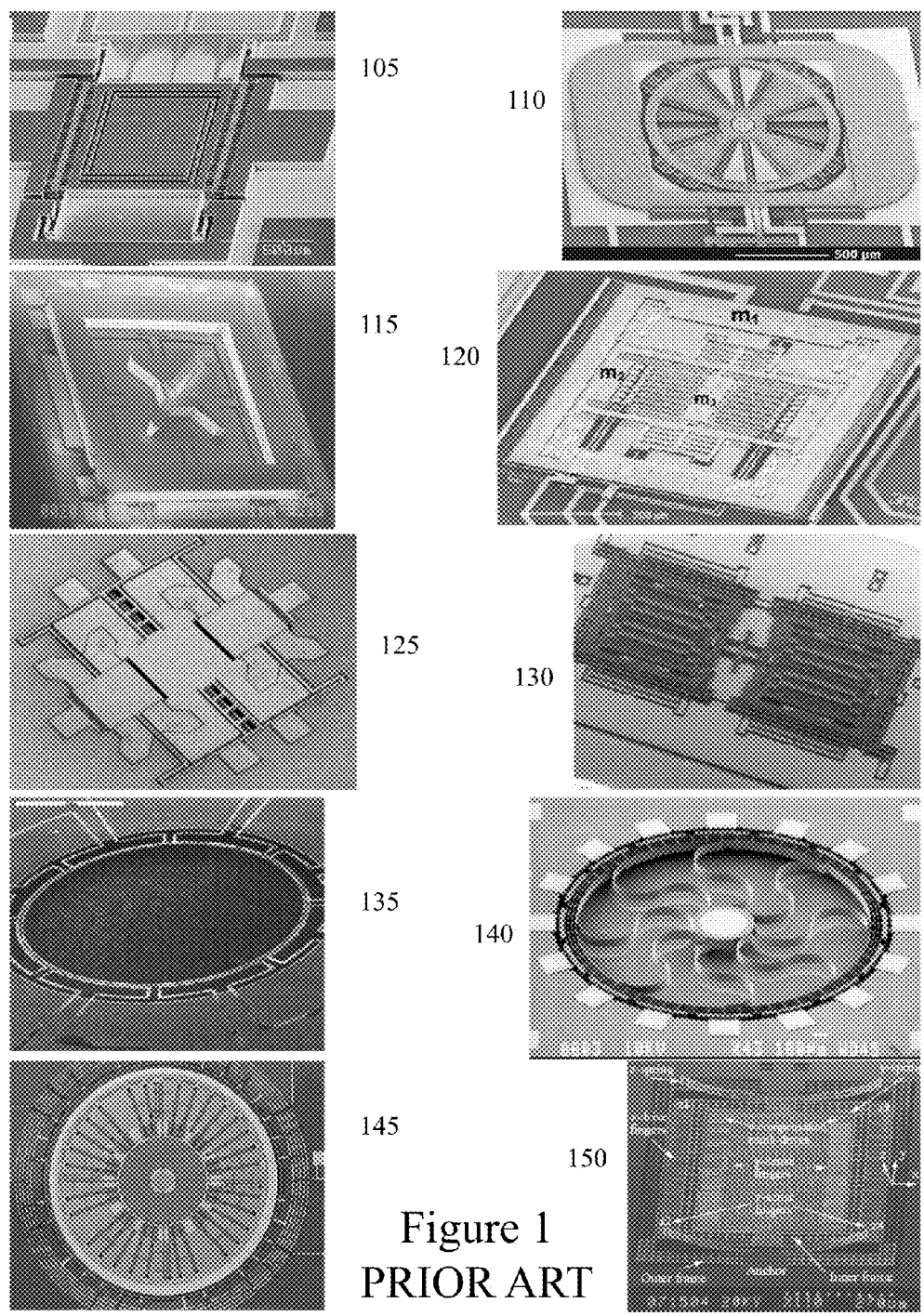
FIG. 1 depicts MEMS gyroscopes according to the prior art.

The present invention is directed to bulk acoustic wave gyroscopes and more particularly to novel designs and manufacturing sequences for said bulk acoustic wave gyroscopes.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

The gimbaled spinning wheel and optical gyroscopes are two well-known approaches to high precision in gyroscopes; however these devices are currently too expensive and bulky for many applications, particularly those requiring low-cost gyroscopes as well as those seeking to integrate gyroscopes into small consumer electronics etc. Accordingly, vibratory gyroscopes have been the focus of significant research, development, and commercialization. Vibrating mechanical elements are used to sense the rotation rate by measuring Coriolis accelerations and eliminate any need for moving parts, allowing a simple device structure and structures that are excellent candidates for miniaturization using micromachining techniques due to the absence of rotating parts, e.g. bearings, in their structure. Additionally they can be readily miniaturized and batch fabricated to produce low-cost, small-size and low-power devices. Additionally, vibratory gyroscopes offer the possibility of sensing rotation about more than one axis, with smaller form factors and power consumption than other types of gyroscopes.

All vibratory gyroscopes use vibrating mechanical elements to sense the Coriolis acceleration arising from rotation in rotating reference frames. Coriolis acceleration results from the motion orthogonal to the angular velocity ($\Omega$) of a rotating system. For a particle with linear velocity $\vec{v}$ this is expressed as $\vec{a}_{Coriolis}$ as given by Equation (1) below.

$$\vec{a}_{Coriolis} = -2\vec{v} \times \vec{\Omega} \qquad (1)$$

From this acceleration, a fictitious force known as "Coriolis force" is derived. This force is exerted on a moving body in the local rotating frame. As Equation (1) shows, this acts orthogonal to the body's velocity direction and is proportional to the applied rotation rate. This effect is named after Gaspard-Gustave Coriolis, a French scientist, who described it in 1835, though the mathematics appeared in the tidal equations of Laplace in 1778. Accordingly, typical vibratory rate gyroscopes consist of a mass-spring system that has two or more orthogonal vibration modes. The mass is excited at the resonant frequency of a selected mode, the so-called drive mode, in the reference frame of the device. When the device and its reference frame reference experience rotation, a corresponding Coriolis force induces oscillation in any modes orthogonal to the drive mode. Sensors measure the latter motion directly, the so-called sense mode, but the signal they provide is proportional to the rate of rotation.

Referring to FIG. 1 there are depicted MEMS gyroscopes according to the prior art including:

bulk-micromachined frame gyroscope 105 with independent beams for the drive and sense modes, see Mochida et al in "A micromachined vibrating rate gyroscope with independent beams for the drive and detection modes" (Sensors and Actuators A (Physical), Vol. A80, pp. 170-8);

surface-micromachined frame gyroscope 110 with decoupled angular velocity detector, see Geiger et al. in "Decoupled microgyroscopes and the design principle DAVED" (Sensors and Actuators A (Physical), Vol. A95, pp. 239-49);

coupled-mass gyroscope 115 with silicon baseplate and micro-metal post, see Bae et al in "High Performance MEMS Microgyroscope" (Proc. SPIE Vol. 4755, Design, Test, Integration, and Packaging of MEMS/ MOEMS 2002, p. 316-324);

4-DOF micro-gyroscope 120 with improved oscillation amplitude and decoupled drive and sense oscillations, see Acar et al in "An approach for increasing drive-mode bandwidth of MEMS vibratory gyroscopes" (J. Microelectromechanical Systems, Vol. 14, pp. 520-528);

bulk-micromachined matched-mode tuning fork gyroscope 125, see Zaman et al in "High Performance Matched-Mode Tuning Fork Gyroscope" (Proc. IEEE/ASME Conf. on Microelectromechanical System (MEMS'06), pp. 66-69);

surface-micromachined thick epi-poly gyroscope 130, see Neul et al. in "Micromachined Gyros for Automotive Applications" (Proc. IEEE Sensors 2005, pp. 527-530);

ring micro-gyroscope 135 employing shell-type gyroscope concept with electromagnetic driving and sensing, see Hopkin et al in U.S. Pat. No. 5,932,804 entitled "Vibrating Structure Gyroscope";

LPCVD polysilicon vibrating ring gyroscope 140 with electrostatic driving and sensing and employing bulk micromachining; see Ayazi in "The HARPSS Process for Fabrication of Precision MEMS Inertial Sensors" (Mechatronics, Vol. 12, pp. 1185-1199);

suspended polysilicon disc structure dual-axis gyroscope 145 measuring the rotation rate around x and y axis, see Juneau et al in "Dual axis operation of a micromachined rate gyroscope" (Tech. Digest of the Int. Conf. Solid-State Sensors and Actuators, pp. 883-886, 1997);

post-CMOS processing x-z axis frame gyroscope 150, see Hao et al "Integrated multiple-device IMU system with continuous-time sensing circuitry" (Tech. Digest IEEE Solid-State Circuits, ISSCC'03, Vol. 1H, pp. 204-205).

A diverse set of micromachining fabrication technology such as surface-micromachining, bulk-micromachining, and mixed-mode micromachining have been employed to implement the different architectures depicted in FIG. 1 including the frame, tuning fork and shell-type structures. Surface micromachined devices dominated initial MEMS gyroscope research primarily because of their potential for simple integration with interface electronics. However, they were found to suffer from thin-film residual stress, squeeze-film damping and high thermomechanical noise associated with their low mass, see for example Xie et al in "A CMOS-MEMS Lateral-Axis Gyroscope" (Proc. IEEE/ASME Conf. Microelectromechanical Systems, pp. 162-165, 2002). The need to address the surface micromachined gyroscopes' issues led directly to research in bulk micromachined gyroscopes. Bulk-micromachined devices can provide large capacitance or piezoresistive readouts due to their large electrode areas. The issues in bulk micromachining such as high aspect ratio trench etching, wafer bonding, and vacuum packaging have been addressed and resolved in recent years with the advancement in micromachining tools and technology. Another major development in many prior art bulk micromachined gyroscopes was the adoption of silicon on insulator (SOI) wafer based fabrication techniques. The thick, single crystalline silicon device layer of SOI wafers provided both large mass and sensing area thereby improving the gyroscope performance.

Figure 2:
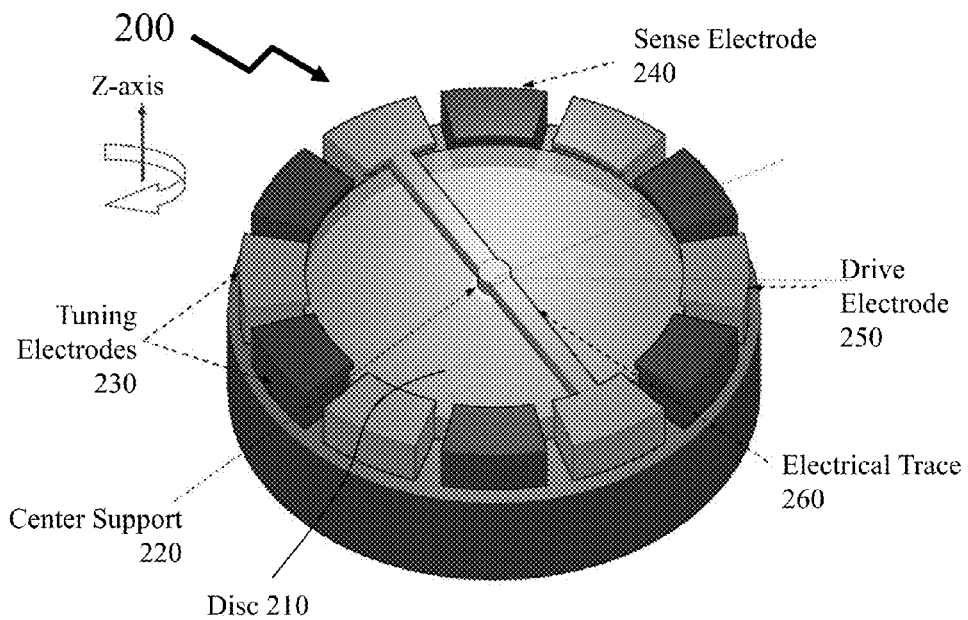
FIG. 2 depicts a BAW MEMS gyroscope.

A schematic view of a Coriolis-based silicon BAW disc gyroscope 200, see Johari et al in "Capacitive Bulk Acoustic Wave Silicon Disc Gyroscopes" (Tech. Digest International Electron Device Meeting, 2006, pp. 513-516), is depicted in FIG. 2. The BAW disc gyroscope 200 consists of a center-supported silicon disc 210 with capacitive drive electrodes 250, sense electrodes 240 and control (tuning) electrodes 230. The locations of the electrodes are chosen depending on the mode of operation and the crystal orientation of the silicon. Electrodes are located at the anti-nodes of the resonant modes in order to provide maximal transduction and also to facilitate matched-mode operation. The capacitive BAW disc gyroscope 200 is supported by a small island of buried oxide layer (BOX), shown in FIG. 2 as the center support 220. The symmetry of the structure provides for self-alignment of the center support 220 to the center of the silicon disc 210 during the BOX etch step. Also depicted are polysilicon traces 260 attached to the center of the disc, to which they are also self-aligned, in order to provide a DC bias voltage to the silicon disc 210. Typically, to release these devices in SOI and facilitate the BOX etch, release holes are typically added to the silicon disc 210, which are not shown in FIG. 2 for clarity.

In order to excite the BAW modes within the silicon disc 210, large electrostatic forces are required, which in turn necessitate large capacitive coupling from the drive electrodes 250. This in turn dictates a high gap-aspect ratio along with very small capacitive gaps in order to provide the required degree of capacitive coupling. Accordingly, these needs have been typically met within the prior art by implementing the devices on thick SOI substrates, typically 30 µm<$t_{Si}$<60 µm, with sub-micron capacitive gaps, g<200 nm.

Figure 3:
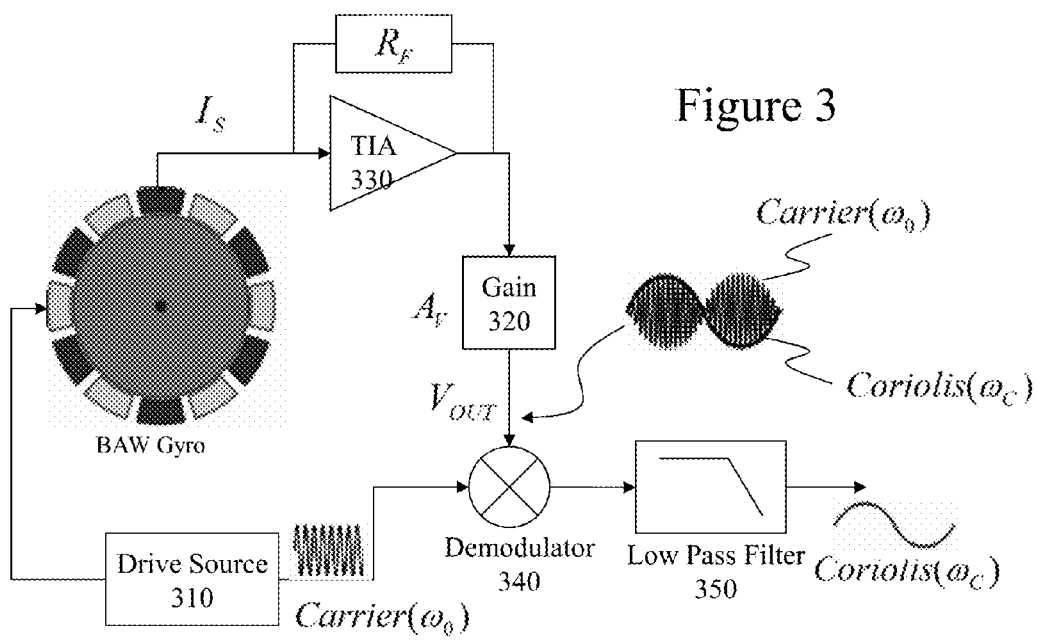
FIG. 3 depicts an excitation and readout circuit schematic for a BAW MEMS gyroscope.

FIG. 3 depicts an excitation and readout circuit schematic for a BAW MEMS gyroscope such as depicted by BAW gyroscope 200 in FIG. 2 above. Accordingly, in order to actuate the capacitive BAW disc gyroscope 200, an AC signal is applied to the drive electrode 250 at the selected resonant frequency from a drive source 310, operating at frequency $\omega_0$, along with the application of DC bias to the silicon disc 210 itself. While the silicon disc 210 is driven at a first degenerative elliptic mode of the two degenerative elliptic modes of vibration it supports, the BAW gyroscope 200 may experience rotation. Accordingly, this rotation and resulting Coriolis acceleration transfers energy between the two degenerative elliptic modes. As energy builds up in the second elliptic mode and the mode vibrates at the sense electrode 240 an output current is generated. This current is then amplified with a transimpedance amplifier (TIA) 330 before being amplified by gain block 330. This amplified output signal, comprising the drive signal $\omega_0$ modulated with Coriolis frequency $\omega_C$, is then coupled in demodulator 340 which also receives the signal from the drive source 310. The output of the demodulator 340, essentially the frequency down-converted modulation applied to the drive signal, is then coupled to a low pass filter 350 wherein the output signal $\omega_C$ represents the Coriolis effect arising from the rotation.

BAW MEMS gyroscopes offer improved performance compared to the prior art commercially deployed MEMS gyroscopes which use moving masses typically vibrating at low frequencies, for example 5 kHz<f<50 kHz. This makes them susceptible to linear acceleration, acoustic energy from audio sources, and temperature fluctuations. In contrast BAW MEMS gyroscopes typically operate at several orders of magnitude higher frequency, for example 1 MHz<f<10 MHz. Further, BAW resonator in silicon can achieve very high Q factors which can typically be Q>10,000, this being a measure of the ability of the mechanical structure to vibrate with very little energy loss, enabling a more efficient mechanical response within the resonator to an excitation signal. BAW MEMS gyroscopes exploit two degenerate resonance modes of a silicon disc with identical frequencies to achieve higher rotation sensitivity compared to moving mass architectures that use a single resonance mode. Furthermore, a large bandwidth of a few 100 Hz is attainable.

BAW MEMS gyroscopes allow for small footprints and the exploitation of high volume silicon micromachining based manufacturing and packaging processes. Increased stiffness of the resonator also improves shock resistance and reduces air damping allowing simplified packaging as vacuum operation is not required. Being essentially a stationary device, the BAW MEMS gyroscope also exhibits relative insensitivity to vibration and temperature fluctuations in the environment. Further, by operating outside the frequency range of the flicker noise (1/f noise) of standard CMOS interface circuits a lower signal detection limit is possible improving the low frequency rotation performance of the gyroscopes as well as dynamic range.

FIG. 4 depicts first and second BAW MEMS gyroscopes 410 and 420 respectively showing the silicon discs, central support, drive and sensing electrodes and DC bias connection. First BAW MEMS gyroscope 410 is designed to operate in the first elliptic mode and hence exploits 8 electrodes whereas second BAW MEMS gyroscopes 420 is intended to operate in the second elliptic mode and accordingly employs 12 electrodes. Now referring to FIG. 5 there are depicted simulations of these first and second elliptical modes for BAW MEMS gyroscopes according to embodiments of the invention. First simulation image 510 depicts the first elliptical mode for a 1200 μm BAW MEMS gyroscope formed in <110> silicon resonating at approximately 2.9 MHz. Second simulation image 520 depicts the second elliptical mode for a 800 μm BAW MEMS gyroscope formed in <100> silicon resonating at approximately 6 MHz.

Considering <100> silicon, as employed in the BAW MEMS gyroscope simulated in second simulation image 520, then these substrates are a common substrate for BAW MEMS gyroscopes as they are widely available and compatible in principle with CMOS electronic circuits that are generally implemented in <100> substrates. However, <100> single crystal silicon is an anisotropic material. For the 800 μm diameter <100> BAW MEMS gyroscope simulated in second simulation image 520 the frequency separation between the primary degenerative modes, which are spatially separated by 45°, is approximately 6 MHz which makes the primary elliptic vibration mode unsuitable for gyroscope applications. However, the secondary elliptic vibration modes of the same device, which are 30° offset, have nearly identical frequencies, Δf≤100 Hz. This implies that for <100> silicon the secondary elliptic modes should be employed to enable matched-mode operation.

In contrast <111> silicon, or alternatively polysilicon, is an isotropic material such that whilst the two primary elliptic degenerative modes are spatially 45° apart as in the <100> silicon disc resonator they have very similar resonance frequencies, Δf<100 Hz. Accordingly, this implies that BAW MEMS gyroscopes implemented in <111> silicon substrates should be operated in their primary elliptic modes instead of secondary elliptic modes.

Figure 6:
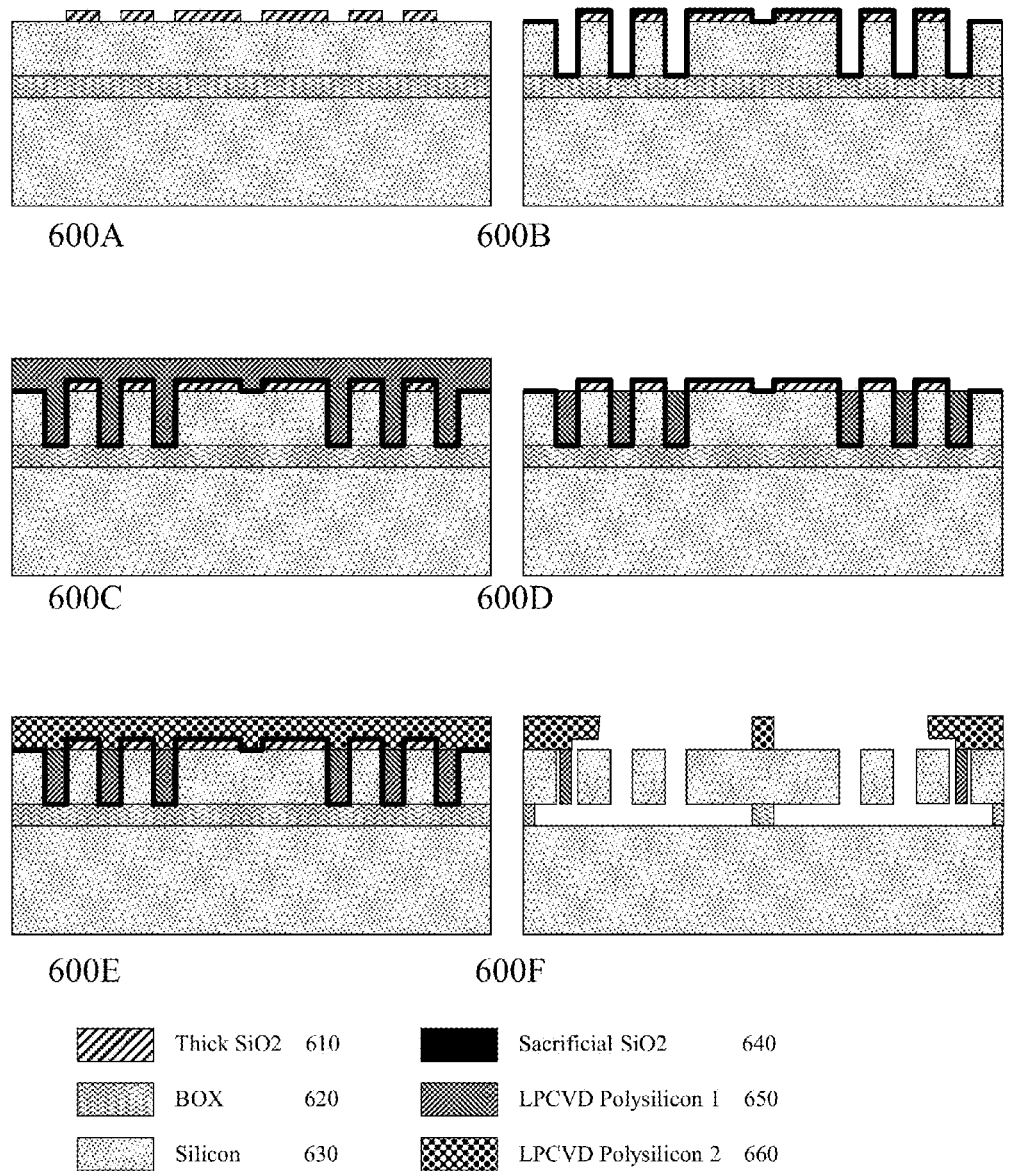
FIG. 6 depicts a manufacturing flow for a BAW MEMS gyroscope according to the prior art.

It was noted supra that <100> silicon is commonly employed in BAW MEMS gyroscopes of the prior art due to compatibility with CMOS electronic circuits that are also implemented in <100> substrates. Referring to FIG. 6 there is depicted a manufacturing flow for a BAW MEMS gyroscope according to the prior art of Johari, Johari in "Micromachined Capacitive Silicon Bulk Acoustic Wave Gyroscopes" (PhD Thesis, Georgia Institute of Technology, 2008), and Shah et al in "CMOS ASIC for MHz Silicon BAW Gyroscope" (IEEE Intnl. Symp. Circuits and Systems, ISCAS'08, pp. 2458-2461). The process begins with growth of a 2 μm thick silicon oxide 610 on the SOI substrate, using wet oxidation at 1000° C. This thick silicon oxide 610 is patterned to define the resonating perforated disc structures and act as a mask for proceeding steps as shown in first image 600A. The location of the center support region is also determined by this step, ensuring that it is self-aligned with the disc. Then, deep trenches are etched through the SOI device layer at the release hole locations and around the disc, the latter isolating the resonating structure. Next a thin layer of sacrificial LPCVD silicon oxide (SACOX) 640 is grown using dry-oxidation at 950° C., alternatively LPCVD oxide at 825° C., and boron doped at 1050° C. for an hour. This layer will form the capacitive gaps later. The structure at this point in the manufacturing sequence is shown in FIG. 600B.

After this, the trenches are refilled with first LPCVD polysilicon 650 deposited at approximately 600° C. with 100 SCCM SiH4 and boron doped (ρ0.1 Ω·cm), thereby creating the electrodes inside the trenches, as shown in third image 600C. The first LPCVD polysilicon 650 is then etched from the surface, uncovering the SACOX which is then patterned and removed from the surface everywhere except around the disc edge and perforation edges as shown in FIG. 600D. The remaining SACOX protects the edges of the resonating structure during poly etching inside the trenches, which is the next step. Then, the second LPCVD polysilicon layer 660 is deposited, boron doped, and annealed at 1050° C. for 2 hours as shown in fifth image 600E. The second LPCVD polysilicon 660 is patterned on the surface to define the pads as well as the polysilicon traces, which are self-aligned to the center of the disc. Finally, the BAW MEMS resonator disc is released through hydrofluoric acid (HF) etching of the buried oxide layer (BOX) 620 of the SOI substrate. A small island of the BOX 620 within the SOI substrate is left by this step to act as a center support, thereby calling for careful timing of the HF release process. In principle, the symmetry of the structure ensures that the support is self-aligned to the center of the disc structure during the BOX etch step. However, variations in the BOX 620 and vias formed within the silicon 630 may result in an offset central support beneath the disc.

Typically, CMOS-MEMS may be implemented CMOS first, MEMS first, or concurrently. However, Takeuchi et al in "Thermal budget limits of quarter-micrometer foundry CMOS for post-processing MEMS devices" (IEEE Trans. on Electron Devices, Vol. 52, pp. 2081-2086) state that with a criterion of 10% increase in resistance for vias within the fabricated circuits that the maximum allowable thermal budgets are 6 hours, 1 hour, and 0.5 hour at 425° C., 450° C., and 475° C. respectively. Accordingly, such an integration of a BAW MEMS gyroscope according to the prior art of Johari and Shaw can only be achieved from a process flow of MEMS first fabrication followed by CMOS fabrication. Accordingly, the gyroscope is fabricated adjacent to the CMOS electronics resulting in increased die footprint and cost.

Figure 7A:
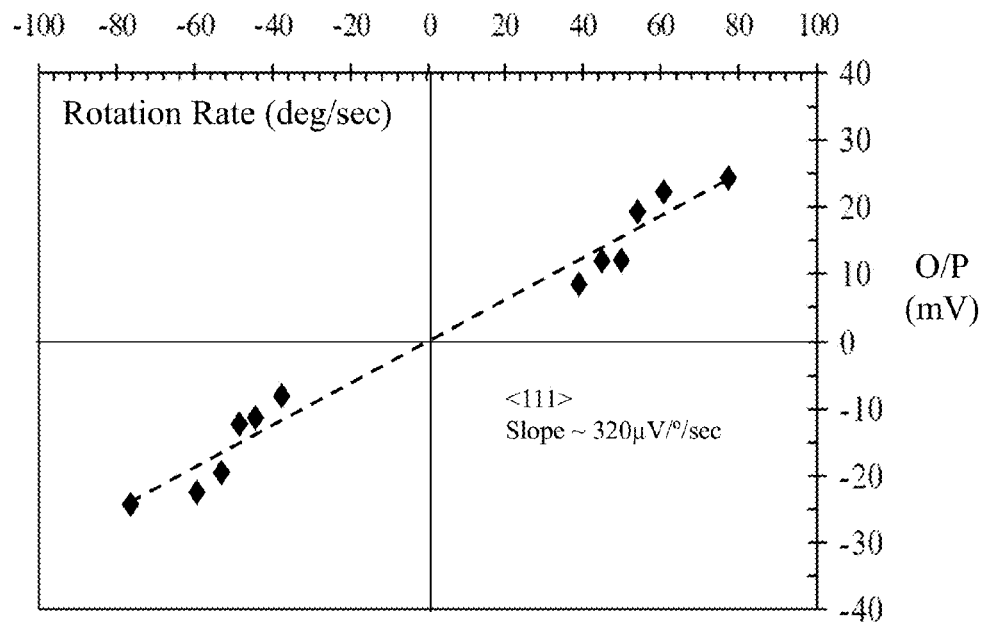
FIGS. 7A and 7B depict output versus rotation rate for <111> and <100> BAW MEMS gyroscopes according to the prior art.
Figure 7B:
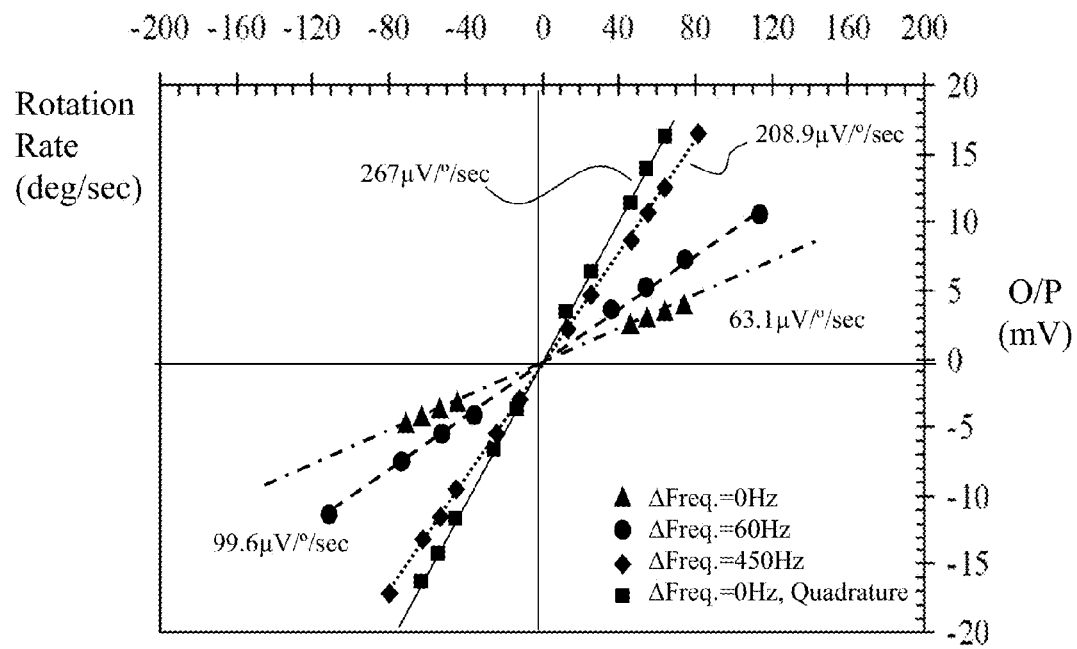

Now referring to FIG. 7A there is depicted the output voltage versus rotation rate for a <111> BAW MEMS gyroscope according to the prior art. Accordingly, as shown the <111> gyroscope provides an output sensitivity of ≈320 μV/°/sec. In contrast the output for a <100> BAW MEMS gyroscope according to the prior art is presented in FIG. 7B. Accordingly, the sensitivity of the <100> BAW MEMS gyroscope to frequency mismatch between the two degenerate elliptical modes can be seen from the results for frequency offsets, Δf, of 450 Hz, 60 Hz, and 0 Hz respectively wherein the output sensitivities are ≈63 μV/°/sec, ≈100 μV/°/sec, and ≈210 μV/°/sec. These sensitivities being under the conditions that no alignment of the phase of the mechanical output to a −90° shift from the input acceleration is provided. Achieving this phase alignment, commonly referred to a quadrature cancellation, the accelerometer is operating at the peak Q. With quadrature cancellation the ≈210 μV/°/sec output sensitivity is increased to ≈270 μV/°/sec. These sensitivities represent the scale factor of the <111> and <100> BAW MEMS gyroscope devices for a single sense electrode and accordingly can be improved by coupling the other sense electrodes located around the disc to the assigned sense electrode.

Figure 8:
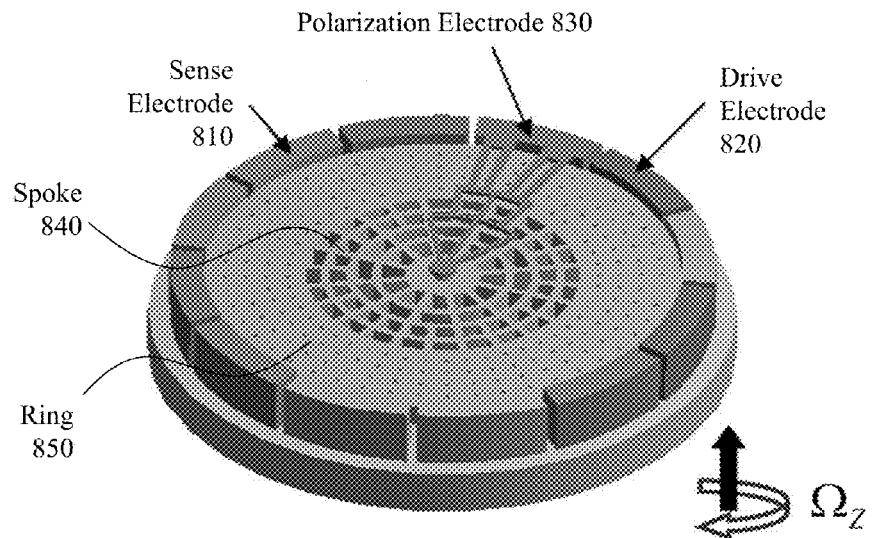
FIG. 8 depicts a "ring" and "spoke" BAW MEMS gyroscope according to the prior art.

Referring to FIG. 8 there is depicted a "ring" and "spoke" BAW MEMS gyroscope according to the prior art of Sung et al in "A 3 MHz Spoke Gyroscope with Wide Bandwidth and Large Dynamic Range" (Proc. IEEE Conf. on MEMS, pp. 104-107, 2010). As depicted the "ring" and "spoke" BAW MEMS gyroscope comprises a central region with spokes 840 which connect from the central support to the outer ring 850. There as usual the sense electrodes 810, drive electrodes 820, and polarization electrode 830. As evident from FIG. 9 this BAW MEMS gyroscope combines the flexural and bulk acoustic modes 920 and 910 respectively wherein the flexural mode occurs within the central region comprising the spokes 840 and the bulk acoustic mode is present within the outer region comprising the ring 850. In contrast to the BAW MEMS gyroscopes described above in respect of FIGS. 2 through 7B whilst the "ring" and "spoke" BAW MEMS gyroscope has lower Q and lower sensitivity, approximately 15 μV/°/s, it does have a wider bandwidth thereby allowing the requirement for mode matching tuning and quadrature cancellation to be removed, thus simplifying the control electronics.

However, the BAW MEMS gyroscopes presented in FIGS. 2 and 8 in order to achieve efficient excitation require very narrow transducer gaps between the drive electrodes, for example drive electrodes 250 and 820 respectively in FIGS. 2 and 8, and the silicon resonator disc, for example disc 210 and ring 850 respectively in FIGS. 2 and 8. Accordingly, such gaps require more complex manufacturing increasing costs. As discussed in the background gyroscopes are increasingly present within motion sensing systems for a variety of consumer electronics. As such, low-cost fabrication is important which would benefit from a relaxation in the requirements for such gaps.

Figure 10A:
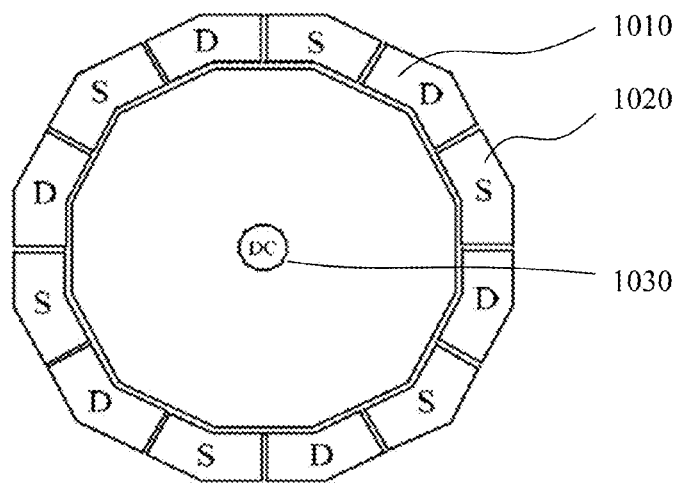
FIGS. 10A through 10C depict a dodecahedral BAW MEMS gyroscope according to an embodiment of the invention together with operating modes and hole pattern for release of the MEMS disc resonator.

As noted supra a BAW MEMS gyroscope exploiting a commercial CMOS compatible MEMS process, such as for example SOIMUMPs, on <100> silicon is operated in the second order bulk mode in order to reduce the frequency separation of the degenerative modes to approximately 100 Hz from approximately 1 MHz for the first order bulk modes. Accordingly, a dodecagonal (12 sided) drive-sense electrode configuration is employed as the second order modes are spatially separated by 30°. Referring to FIG. 10A there is depicted a schematic of the dodecagonal BAW MEMS gyroscope according to an embodiment of the invention which is composed of a central dodecagon structure with a 730 μm face to face distance and a 25 μm disc thickness. The central structure is surrounded by electrodes; those marked as "D" 1010 are used to electrostatically drive the structure, whilst those electrodes marked as "S" 1020 are used to sense the output signal. The central pad 1030 is used to connect the necessary DC bias voltage to the disc structure thereby precluding the requirement for suspended upper traces as used in the prior art or for a lower metallization layer that would result in a more complex fabrication process.

Figure 10B:
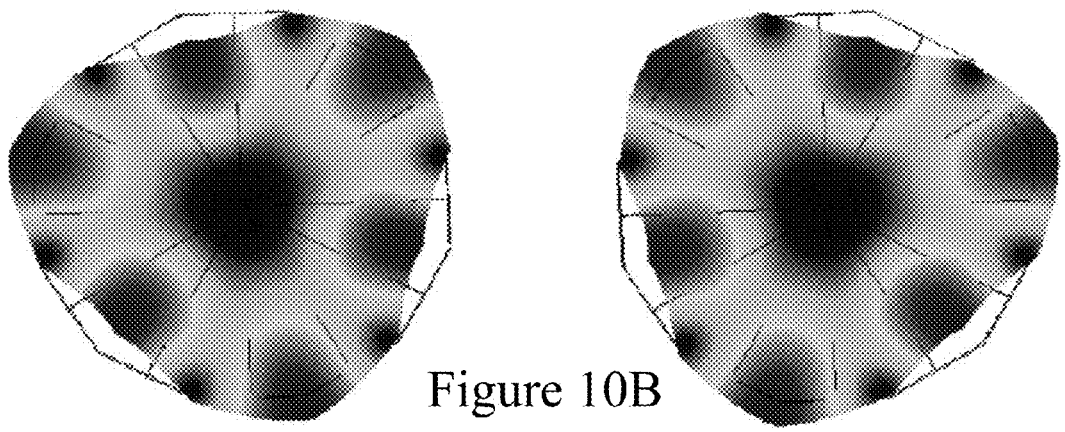

Additionally, the transducer gap between the resonator and electrodes was 3 μm allowing the BAW MEMS gyroscopes according to embodiments of the invention to be manufactured with commercially available low-cost SOI technologies, such as MEMSCAP's SOIMUMPs for example. In order to release the disc structure 10 μm diameter and 25 μm spaced release holes were added to the disc. These release holes being distributed around the structure in a symmetric manner, in order to mitigate any frequency split that may arise due to their presence. The resulting dodecagonal BAW MEMS gyroscope layout being depicted in FIG. 10C. Eigen frequency analysis performed for the structure and second order bulk modes yielded drive and sense resonance frequencies of 8.135626 MHz and 8.135742 MHz respectively, spatially separated by 30°, as depicted in FIG. 10B. Measured drive and sense resonance curves are presented in FIGS. 11A and 11B respectively. The 3 dB bandwidth of the dodecagonal BAW MEMS gyroscope according being calculated to be approximately 810 Hz which is two orders of magnitude higher than that typically achieved in flexural mode gyroscopes. This wide bandwidth relaxes the requirement for electronic mode matching between the drive and sense modes, and consequently simplifies the circuitry as mentioned earlier.

By performing harmonic analysis, $q_{drive}$, was found to be 3.5 nm. Then, by applying a Coriolis force load, and running a sweep for the angular rate input, the displacement of the sense vertices was found to be $7.5 \times 10^{-13}$ m/°/s. According to Equations (2) and (3) below this is equivalent to capacitance and current sensitivities of 0.002 aF/°/s and 2.3 pA/°/s per electrode, respectively. The resulting response of the gyroscope to input angular rate is shown in 11C, showing a dynamic range of ±2000°/s.

$$\Delta C \approx \frac{\varepsilon_0 A_{electrode}}{gap^2} \cdot \Delta disp \quad (2)$$

$$I = \frac{d(CV_{DC})}{dt} \approx \Delta C \cdot V_{DC} \cdot \omega_0 \quad (3)$$

$$q_{sense} = 4 A_g \frac{Q}{\omega_0} q_{drive} \Omega_z \quad (4)$$

$$\Omega_{z(Brownian)} \left[ \frac{rad}{s \cdot \sqrt{Hz}} \right] = \frac{1}{4 A_g q_{drive}} \sqrt{\frac{4 k_B T}{\omega_0 M Q_{effect-sense}}} \quad (5)$$

ΔC and Δdisp vary harmonically with a frequency equal to the resonance frequency, $\omega_0$ in response to the AC excitation voltage. Using Equations (4) and (5) the angular gain, $A_g$, and mechanical noise of the sensor were found to be 0.3 and 1°/√hr respectively for an assumed worst case quality factor of 10,000.

Figure 9:
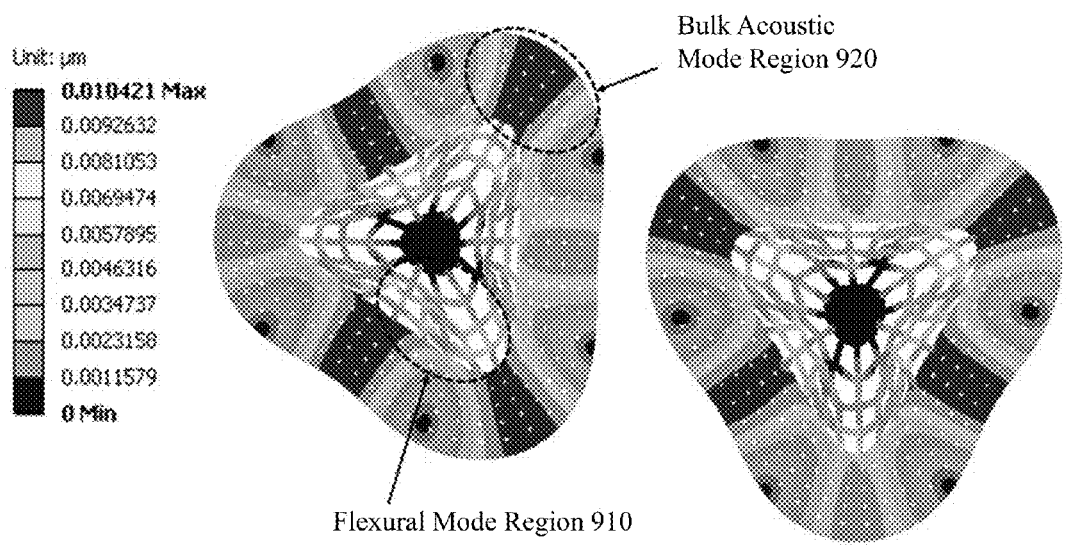
FIG. 9 depicts the flexural and bulk acoustic modes of the "ring" and "spoke" BAW MEMS gyroscope of FIG. 10.
Figure 10C:
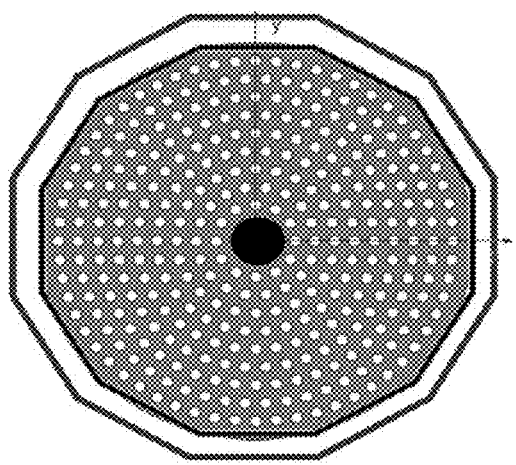
Figure 11A:
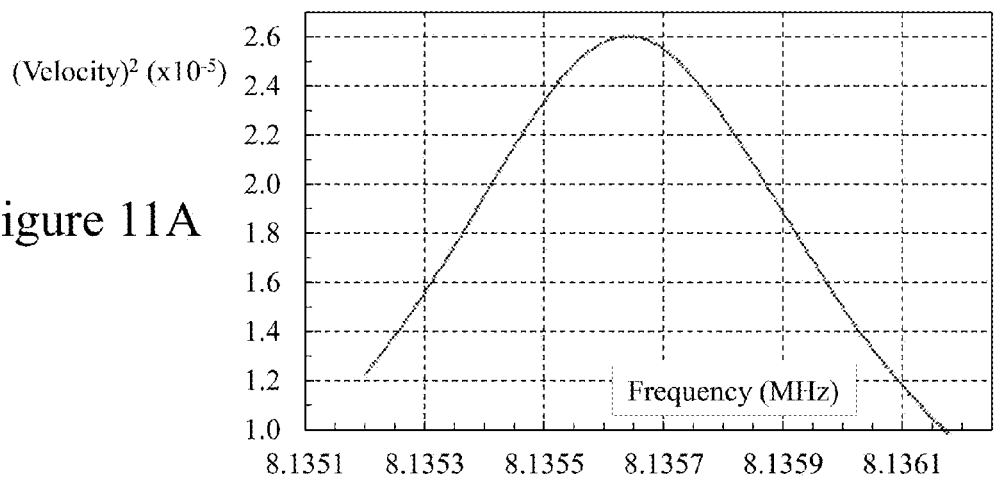
FIGS. 11A through 11C depict frequency response of a dodecagonal BAW MEMS gyroscope according to an embodiment of the invention together with rotational sensitivity.
Figure 11B:
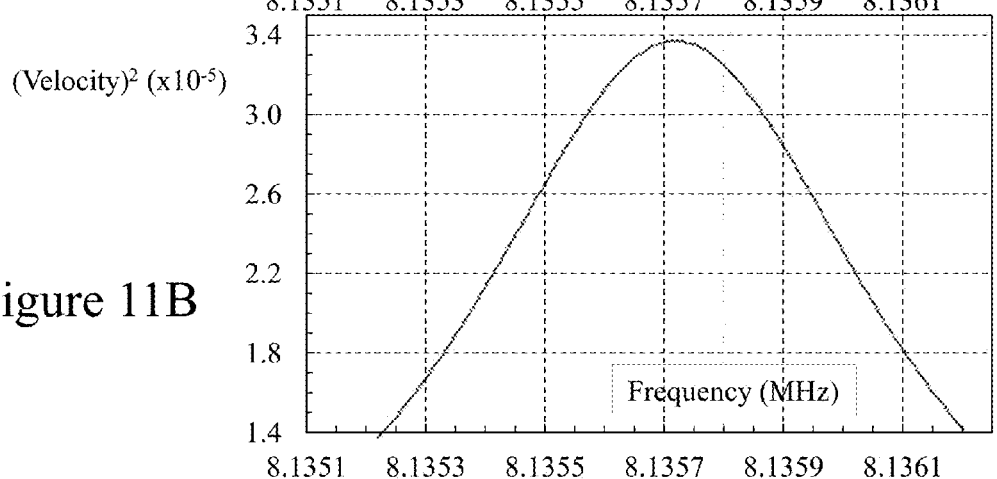
Figure 11C:
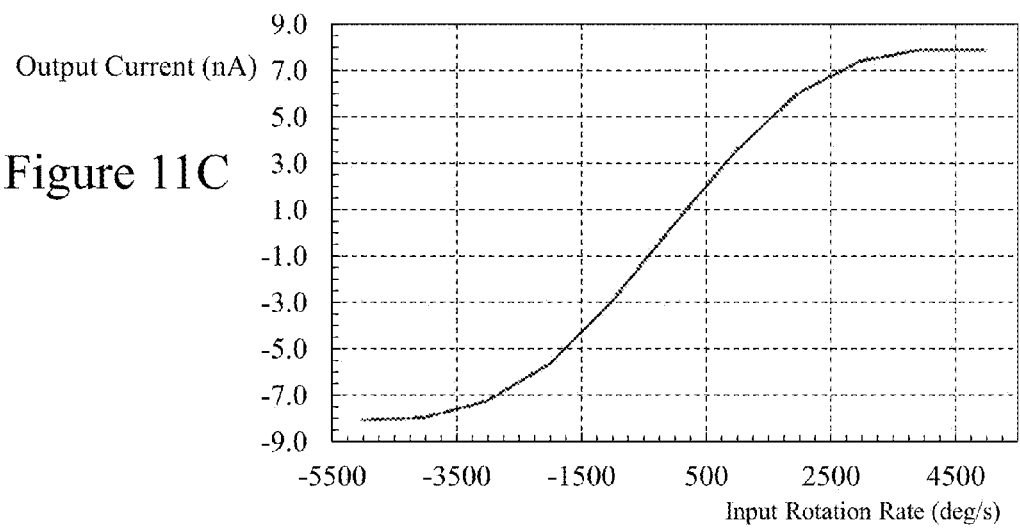

Accordingly, it is evident that in both the "ring" and "spoke" BAW MEMS gyroscope, as depicted in respect of FIGS. 8 and 9, and the dodecagonal BAW MEMS gyroscope compatible with low cost commercial SOI-MEMS manufacturing, as depicted in FIGS. 10A through 10C, that these regions of the BAW MEMS gyroscope design space to reduce either electrical controller complexity or manufacturing cost yield devices with reduced output signal amplitudes compared to the design space of increased controller complexity and manufacturing cost as represented by the prior art, including for example Johari, Shaw, Ayazi et al in "A HARPSS Polysilicon Vibrating Ring Gyroscope" (IEEE J. MEMS, Vol. 10, pp. 169-179), and Zaman et al in "The Resonating Star Gyroscope: A Novel Multiple-Shell Silicon Gyroscope with Sub-5 deg/hr Allan Deviation Bias Instability" (IEEE J. Sensors, Vol. 9, pp. 616-624).

Figure 12A:
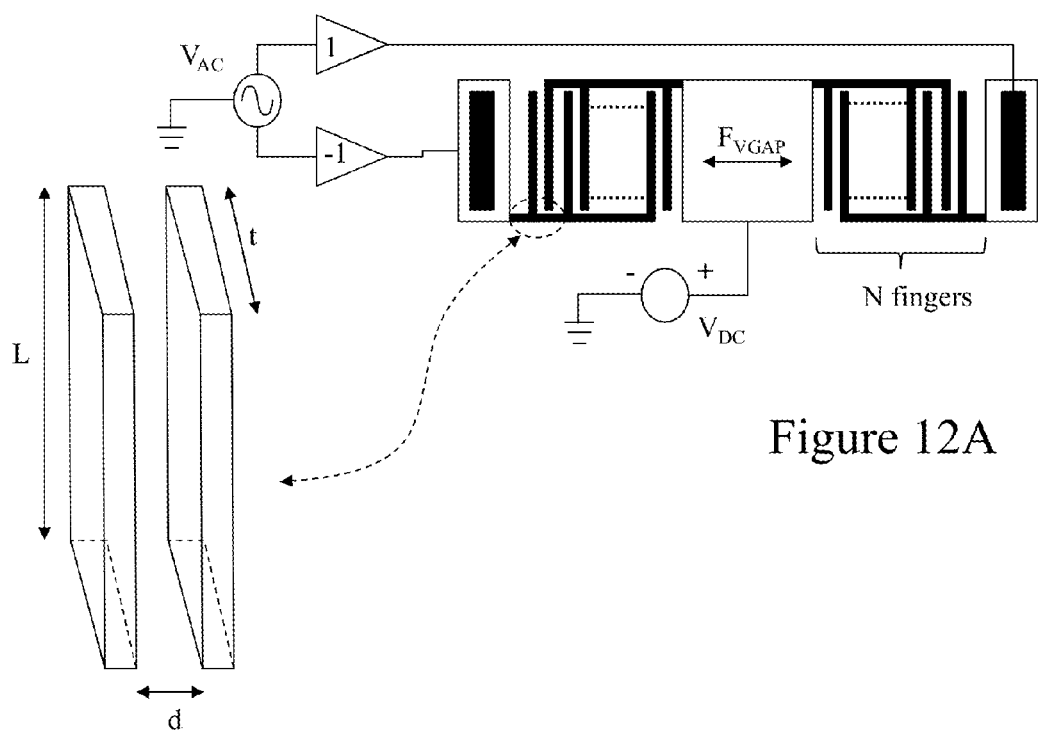
FIGS. 12A and 12B depicts circuit schematics for comb based couplings to a BAW MEMS gyroscope according to an embodiment of the invention.
Figure 12B:
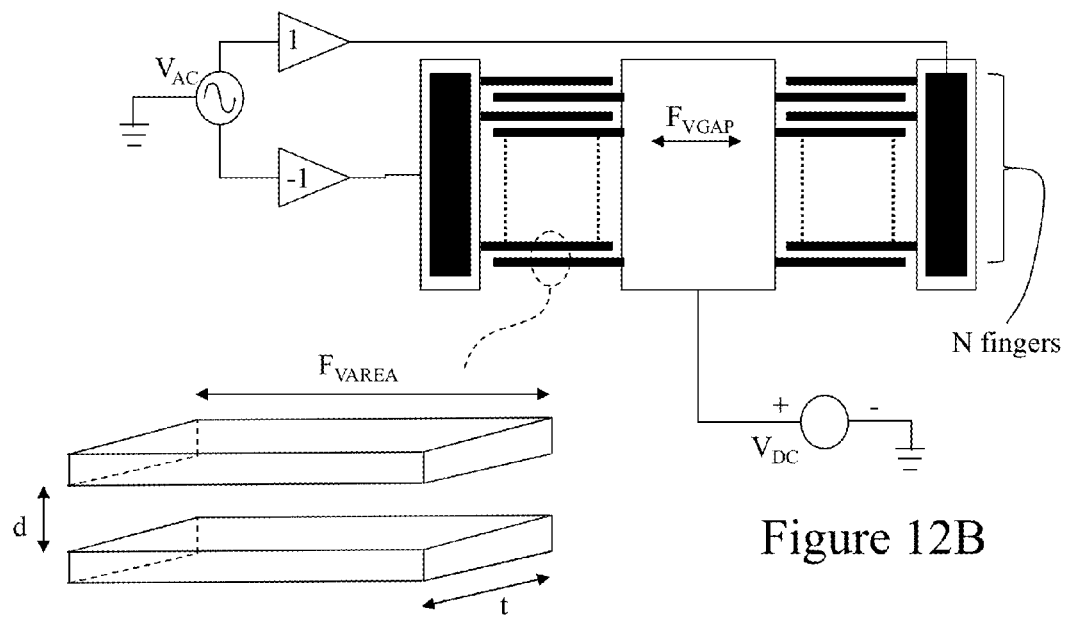

Accordingly, it would be beneficial to provide a means of enhancing the output signal level without significantly adjusting those elements of the manufacturing and design that provided the reduced control circuit complexity and lower manufacturing cost. Accordingly, the inventors have extended the BAW MEMS gyroscope concepts by the addition of electrostatic comb elements. These may be variable gap, such as depicted in FIG. 12A, or variable area, such as depicted in FIG. 12B. The former provide for increased force for the same gap as the variable area comb although the latter have improved linearity with displacement.

As depicted in FIG. 12A the variable gap comb elements are disposed between the drive electrode contact and the resonator disc. Accordingly, as depicted the DC bias voltage is applied to the resonator disc whilst out of phase drive signals are applied to opposite drive electrodes, as represented by the +1 and −1 gain stages coupled between the drive electrodes and the AC drive source. For fingers of length L, thickness t, and spacing d, the electrostatic force $F_{VGap}$ is given by Equation (6) below. In contrast as depicted in FIG. 12B the variable area comb elements have their fingers orientated at right angles to those in the variable gap comb elements and perpendicular to the resonator disc/drive electrodes. Accordingly, the $F_{VArea}$ is given by Equation (7) below.

$$F_{VGap} = 2\frac{N\varepsilon_0 Lt}{d^2}V_{DC}V_{AC} \qquad (6)$$

$$F_{VArea} = 4\frac{N\varepsilon_0 t}{d}V_{DC}V_{AC} \qquad (7)$$

Figure 13A:
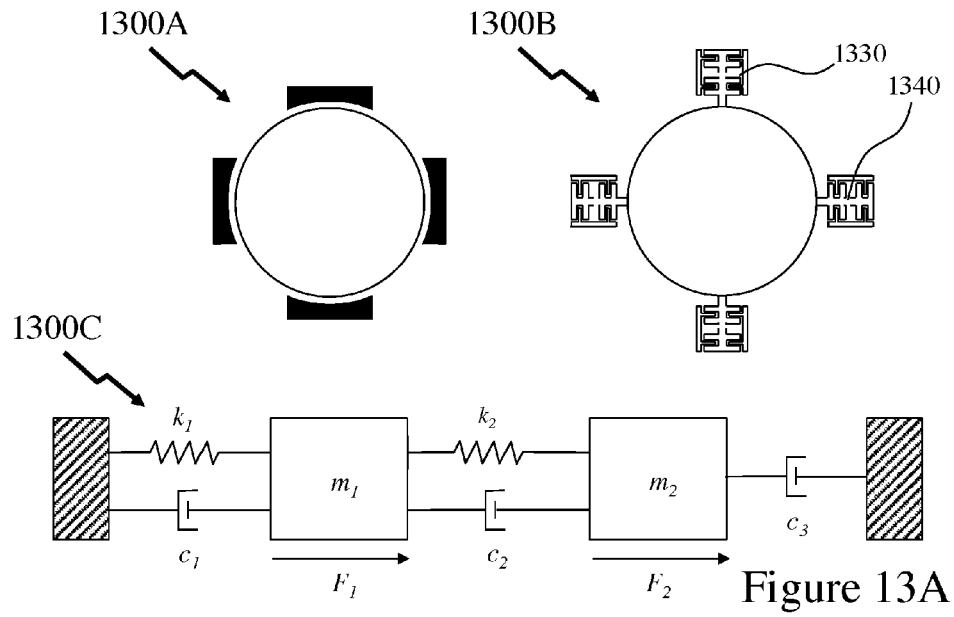
FIG. 13A depicts simplified illustrations of a prior art disk BAW gyroscope and a disk-comb BAW gyroscope according to an embodiment of the invention together with spring-damper model.

The idea proposed here extends the central resonating disk structure by adding parallel plate comb drives with variable gap (variable area) configurations to those portions of the resonator disk which exhibit the maximum vibration amplitude in the drive and sensor resonant modes, as shown in simplified form in FIG. 13A in second image 1300B when compared to prior art Baw resonator gyroscopes as depicted in first image 1300A in FIG. 13A. As will be shown below theoretically and experimentally this increases the drive strength and enhances the device sensitivity. This sensitivity improvement is due to the increased electrostatic force and capacitance change that result because of the larger electrode surface area as described supra in respect of Equations (6) and (7).

Generally, any resonating structure, including the disk resonator and the comb resonating structure, can be modelled with a mass-spring-damper system wherein a mass is modelled as being mechanically coupled to a fixed object via a spring with a spring constant, k, and a damper with a damping coefficient, c, and is acted upon by a force, F. In order to model the combined resonating system of a disk-comb BAW MEMS gyroscope, the mass-spring-damper models for both the disk and the comb resonators are combined to give the double mass-spring-damper system shown in third image 1300C FIG. 13, which will be used to illustrate the operating principle of the combined disk-comb device. $k_1$, and $k_2$ kg are the spring constants of the disk (primary structure) and the comb (secondary structure), respectively; $m_1$, and $m_2$ are the masses of the disk and the comb, respectively; and $c_1$, $c_2$, and $c_3$; are the different damping coefficients acting on the system. $F_1$ is the electrostatic force acting on the disk faces directly, and $F_2$ is the total electrostatic force of each comb drive. Displacements of the primary and secondary masses are denoted by $x_1$ and $x_2$ respectively. This system can be described by Equations (8) and (9) and simplified to yield Equations (10) and (11) respectively.

$$F_1 - k_1 x_1 - c_1 \dot{x}_1(t) - k_2(x_1(t) - x_2(t)) - c_2(\dot{x}_1(t) - \dot{x}_2(t)) = m_1 \ddot{x}_2(t) \qquad (8)$$

$$F_2 - k_2(x_2(t) - x_1(t)) - c_2(\dot{x}_2(t) - \dot{x}_1(t)) - c_3 \dot{x}_2(t)(m_1 \ddot{x}_2(t)) \qquad (9)$$

$$F_1 - (k_1 + k_2)x_1(t) + k_2 x_2(t) - (c_1 + c_2)\dot{x}_1(t) + c_2 \dot{x}_2(t) = m_1 \ddot{x}_1(t) \qquad (10)$$

$$F_2 + k_2 x_1(t) - k_2 x_2(t) + c_2 \dot{x}_1(t) - (c_2 + c_3)\dot{x}_2(t) = m_2 \ddot{x}_2(t) \qquad (11)$$

Since the force of a given comb finger is, by design, equivalent to the force applied onto a disk face, the total comb force is applied to the disk face, then the relationship between $F_1$ and $F_2$ is $F_2 = nF_1$, where n is the number of fingers in each comb drive. By solving Equations (8) and (9) simultaneously and taking into consideration $F_2 = nF_1$ then the system transfer function can be reached as given by Equation (12).

$$\frac{X_1(S)}{F_1(S)} = \frac{(m_2 S^2 + ((n+1)c_2 + c_3)S + (n+1)k_2)}{\begin{bmatrix} m_1 m_2 S^4 + (m_1 c_2 + m_1 c_3 + m_2 c_2 + m_2 c_2)S^3 + \\ (m_1 k_2 + m_2 k_1 + m_2 k_2 + c_1 c_2 + c_1 c_3 + c_2 c_3)S^2 + \\ (c_1 k_2 + c_2 k_1 + c_3 k_1 + c_3 k_2)S + k_1 k_2 \end{bmatrix}} \qquad (12)$$

Figure 13B:
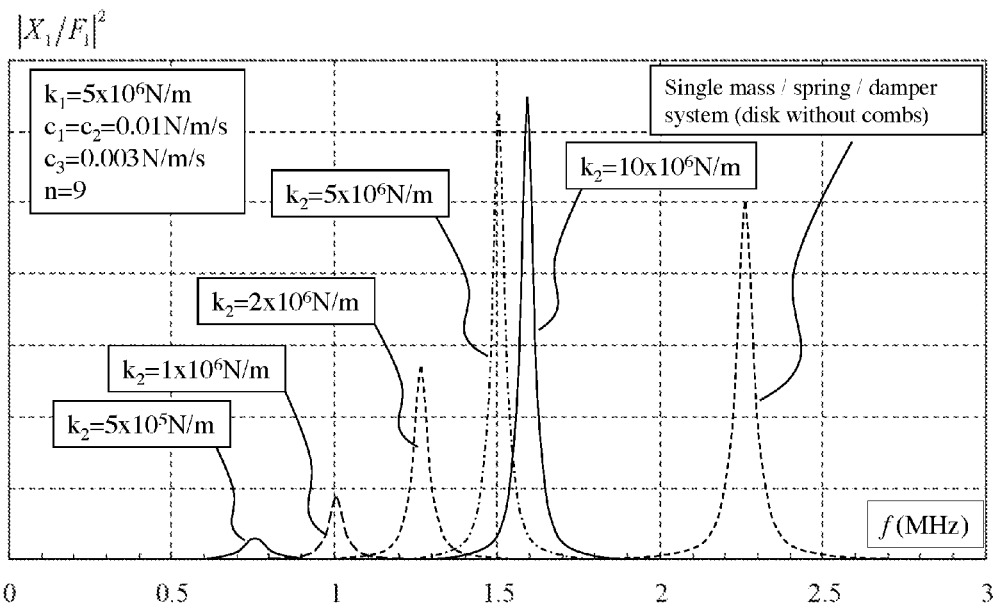
FIG. 13B depicts the simulated system transfer characteristics for a disk-comb BAW gyroscope according to an embodiment of the invention with varying spring constant in comparison to a prior art disk Baw gyroscope.

FIG. 13B shows the magnitude of this transfer function versus frequency for different values of $k_2$, with all other parameters kept constant. The transfer function of a single mass-spring-damper system ($m_1$:$k_1$:$c_1$) is also plotted for comparison and is given by Equation (13). The equivalent force of the comb $(n+1)F_1$ is applied to the single spring-mass-damper system for the comparison.

From FIG. 13B it is evident that when the secondary spring constant is small compared to the primary spring constant, the primary mass displacement at resonance is small, as the force on the secondary mass is not conveyed effectively to the primary mass. As the secondary spring constant is increased, the force is coupled more effectively to the disk and the displacement increases even over the displacement in a single spring-mass-damper system when the same total force is applied directly to the primary mass. Accordingly, the invention of the inventions is based upon increasing the disk drive coupling and sense coupling by designing the spring constant of the comb drive structure so that its driving force (and sensing) enhances optimally the performance of the bulk resonant structure. Design and manufacturing methodologies established by the inventors are well-suited to bulk mode devices built in sub-micron gap technologies (~100 nm), to produce very high performance devices. For example, the inventors have implemented such disk-comb BAW MEMS sensors using commercial silicon-on-insulator manufacturing design rules, such as a 3 μm gap technology SOIMUMPs process offered by several foundries.

An embodiment of the invention is depicted in FIG. 14A as detailed by the inventors within Elsayed et al. in "A Combined Comb/bulk Mode Gyroscope Structure for Enhanced Sensitivity" (26th IEEE. Conf, MEMS, pp. 649-652). The structure depicted in FIG. 14A is composed of a central dodecagon structure with a 730 μm face to face distance and a 25 μm thickness. A dodecagon structure was chosen for this implementation as it could be fabricated upon a standard commercial 3 μm foundry SOIMUMPs technology, where the device layer is "100" single crystalline silicon (SCS), which is anisotropic. In a disk with the same central disk dimensions, the first order bulk mode exhibits a 1 MHZ split between the drive and sense modes. As a closer matching of the drive and sense modes was a design target the second order bulk mode of the dodecagon structure was employed as this provides for a drive-sense mode separation of only 270 Hz. As the drive and sense modes for the second order mode of the disk are spatially separated by 30° a 12-sided structure provides inherently 30° between its vertices, so that the second order maxima coincide with some disk vertices whilst the drive is applied to other disk vertices.

Comb fingers of 25 μm width were added to the vertices, which are the points that exhibit the largest vibration amplitudes. The dimensions of the fingers were optimized, as discussed below in respect of FIGS. 15A through 15D, to ensure a sufficiently large stiffness. As discussed supra, this stiffness allows the forces applied to the fingers to be conveyed efficiently to the disk vertices because of the sufficiently high comb spring constant, and also ensures that the combs vibrate constructively with the disk in the wanted senses/drive modes rather than in any spurious modes. As shown in FIG. 14A, the resonating structure is surrounded by electrodes that electrostatically drive the structure (marked as "D") and sense its output signal differentially (marked as "S"). The central pad (marked as "C") is used to connect the necessary DC bias voltage to the disk structure. The use of the central pad precludes the need for suspended upper traces above the disk or for a lower metallization, both of which would result in a more complex fabrication process. In order to release the structure, release holes with 10 μm diameter and spaced out by 25 μm are added to the disk. These release holes are distributed around the structure in a symmetric manner, in order to mitigate any frequency splits that may arise due to these holes. In addition, the release holes are distanced from the central pad, in order to ensure that a complete release of the disk can be performed, without etching the sacrificial layer under the central pad.

The gyroscopes were fabricated in the MEMSCAP SOI-MUMPs technology although other commercial foundry, commercial, research, and other fabrication methodologies may be employed. The fabrication steps of the SOIMUMPs technology are briefly outlined in FIG. 14B and are provided in more detail within "SOIMUMPs Design Handbook" (Rev. 4.0, MEMSCAP Inc., 2004). The gyroscope is fabricated on a double-side polished SOI substrate with a 25 μm '100' SCS structural layer, step 1410. The top layer is then doped by depositing phosphosilicate glass (PSG), step 1420, which is then removed by wet etching. Afterwards, a pad metal layer is deposited and patterned by a liftoff process to form the metal pads for the electrical connections, step 1430. Subsequently, the device layer is lithographically patterned and etched using deep reactive ion etching (DRIE) to form the proof mass and electrodes, step 1440.

Finally, the release was performed in-house by timed hydrofluoric acid (HF) wet etching, step 1450. An etch rate of 1.6 μm/min is stated by Miller et al. in "Characteristics of Commercially Available Silicon-on-Insulator MEMS Material" (J. Sensors and Actuators, Vol. 138, Vol. 1, pp. 130-144), using 48% aqueous HF and a Triton X-100 surfactant. To validate this etch rate, HF etch tests were performed in-house on similar SOI wafers and an etch rate of ~1 μm/min using 49% aqueous HF was measured. It would be evident that careful timing is essential so as to avoid etching below the central pad, which may lead to the structural failure of the disk while wire bonding to it later on, but the timed etch must be long enough to release the structure: both the disk and combs.

Referring to FIG. 15A there is depicted a BAW MEMS gyroscope according to an embodiment of the invention employing variable gap combs wherein the finger length increases as the finger separation from the resonator disc increases. FIG. 15B depicts one finger comb assembly 1510 in an expanded view for a variable gap comb structure according to an embodiment of the invention together with a simplified model of a single comb where the disk is replaced with a spring of constant K. Referring to FIG. 15C there is depicted a BAW MEMS gyroscope according to an embodiment of the invention employing variable gap combs wherein the finger length is fixed for all fingers such that they are constant dimension with increasing separation from the resonator disc. In contrast to the fingers in variable length comb depicted in FIG. 12A the finger thickness is increased to increase the comb stiffness relative to the resonator disc stiffness in order to provide the desired coupling.

Design analysis of the comb was performed using finite element simulations. As mentioned supra, for the device to function properly, the comb fingers should be stiff enough so that the electrostatic force applied to them is coupled to the disk faces, and to ensure that they vibrate constructively with the disk and not in any spurious mode. In order to optimize the width of the comb fingers, $w_f$, the simplified model for a single comb drive depicted in FIG. 15B was employed, where the disk of the MEMS gyroscope is replaced by a spring, wherein the spring constant was obtained through stationary simulations by applying a force to the disk faces and measuring the resulting displacement. This yielded a spring constant $K \approx 1 \times 10^6$. Stationary simulation was then performed on the model in FIG. 15C and the displacement of the comb end which is connected to the spring (point x) was measured and compared to that of the tips of the fingers. The finger width was then tuned such that these displacements were almost the same, and scaled according to the number of fingers on which the force was applied. Table 1 shows the stationary displacement of point x normalized with respect to the applied force per unit area using Equation (13) for different finger widths.

Based on this analysis, a width of 25 μm was selected for use in the design. This sizing ensures that the forces applied to the fingers are coupled to the end of the comb, and thus can actuate the disk effectively, as shown in FIG. 15D. Also, it acts as a good compromise between force coupling and device area.

TABLE 1

Normalized Displacement at Point x for Different Finger Width $w_f$

| Number of Finger Pairs | Normalized Displacement (m³/N) x10¹⁴ Finger Width $w_f$ (μm) | | | |
|---|---|---|---|---|
| | 5 | 10 | 25 | 35 |
| 1 | 0.35 | 0.37 | 0.41 | 0.44 |
| 2 | 0.68 | 0.71 | 0.81 | 0.88 |
| 3 | 1.01 | 1.06 | 1.22 | 1.32 |
| 4 | 1.34 | 1.41 | 1.62 | 1.76 |
| 5 | 1.67 | 1.76 | 2.03 | 2.20 |
| 6 | 1.99 | 2.10 | 2.40 | 2.64 |
| 7 | 2.32 | 2.45 | 2.83 | 3.08 |

TABLE 1-continued

Normalized Displacement at Point x for Different Finger Width $w_f$

| Number of Finger Pairs | Normalized Displacement (m³/N) x10¹⁴ Finger Width $w_f$ (µm) | | | |
|---|---|---|---|---|
| | 5 | 10 | 25 | 35 |
| 8 | 2.65 | 2.80 | 3.25 | 3.52 |
| 9 | 2.98 | 3.15 | 3.70 | 3.96 |

Figures 17A, 17B:
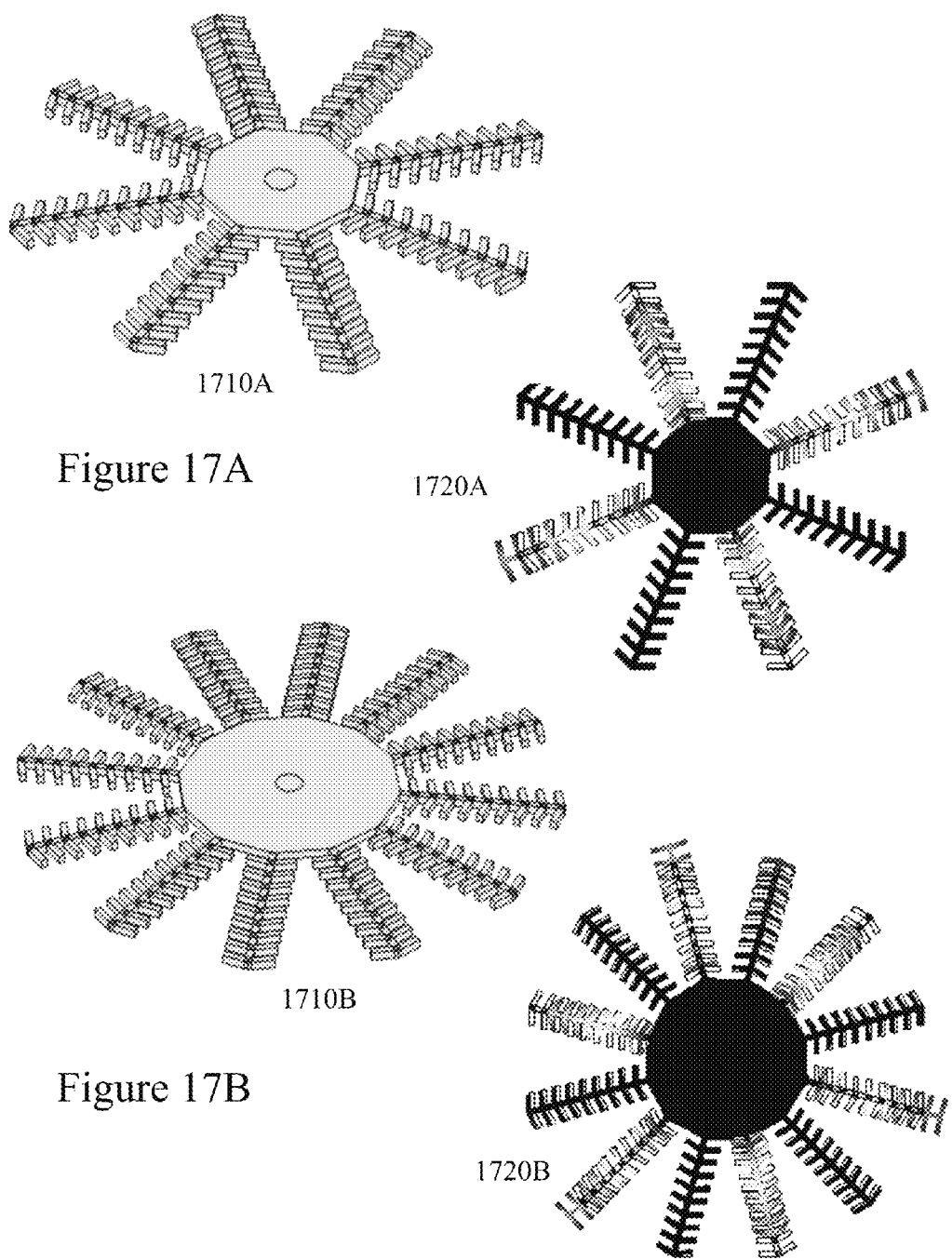
FIGS. 17A and 17B depict schematics and operating mode analysis of comb coupled BAW MEMS gyroscopes in octagonal and dodecagonal configurations according to embodiments of the invention.

FIG. 15D depicts the result of a simulation for a comb structure such as depicted in FIG. 15C according to an embodiment of the invention. FIGS. 16A and 16B depict fabricated octagonal and dodecagonal BAW MEMS gyroscopes respectively according to an embodiment of the invention exploiting a variable gap comb coupling such as depicted in FIG. 15C. FIG. 17A depicts the octagonal BAW MEMS gyroscope according to an embodiment of the invention depicted in FIG. 16A employing variable gap comb coupling structures as central MEMS structure 1710A and simulated vibratory mode 1720A. FIG. 17B depicts the dodecagonal MEMS gyroscope according to an embodiment of the invention depicted in FIG. 16B employing variable gap comb coupling structures as central MEMS structure 1710B and simulated vibratory mode 1720B. The octagonal design has a 500 µm face to face spacing which resonates at 6.8 MHz in a prior art BAW MEMS gyroscope configuration such as depicted in FIG. 2. In contrast the dodecagonal design has a 800 µm face to face distance and resonates at 7.3 MHz in the prior art BAW MEMS gyroscope configuration such as depicted in FIG. 2.

Octagonal simulation 1720A depicts simulation results for the primary elliptic mode of the octagonal design 1610 which resonates now at approximately 1.43 MHz wherein the dodecagonal design 1710 as depicted in the simulation results presented in dodecagonal simulation 1720B resonates at approximately 1.5 MHz. Each of these resonances being close to that of the combs themselves. Accordingly, the variable gap comb has become the main resonating structure and the disc now couples the drive and sense modes. It would therefore be evident to one skilled in the art that the dimensions and structure of the disc may now be established from the coupling between drive and sense modes rather than any consideration of the disc's resonance. Accordingly, the solid disc with symmetric release apertures may become a ring structure, ring and spoke structure, and polygonal shaped such as octagonal, decagonal, and dodecagonal for example.

Figure 18:
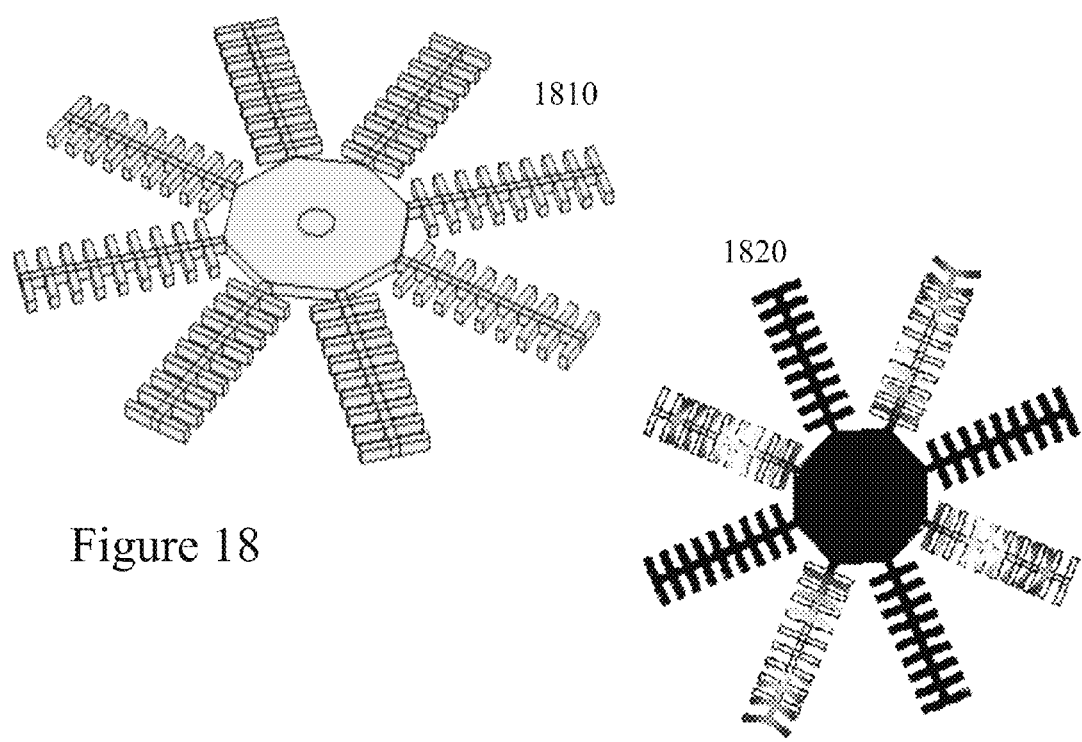
FIG. 18 depict schematic and operating mode analysis of comb coupled BAW MEMS gyroscopes in octagonal configuration with comb fingers orientated normal to supports according to embodiments of the invention.

FIG. 18 depicts normal orthogonal design 1810 and normal orthogonal simulation 1820 depicting the operating mode analysis of a comb coupled BAW MEMS gyroscopes in octagonal configuration with comb fingers that are orientated normal to the comb spine according to an embodiment of the invention. Compared to the angled finger designs presented in FIGS. 14A through 17 the resulting forces from the comb are parallel to the finger supports rather than slightly offset thereby achieving increased signal level.

Figure 19:
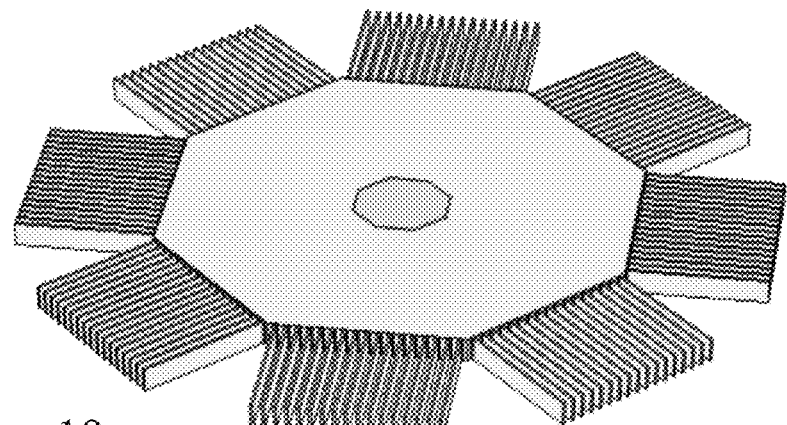
FIG. 19 depicts a schematic of a comb coupled BAW MEMS gyroscope in octagonal configuration with variable area combs according to embodiments of the invention.

Referring to FIG. 19 there is depicted a schematic of a comb coupled BAW MEMS gyroscope in octagonal configuration with variable area combs according to an embodiment of the invention. In this design approach the combs are not intended to affect the resonance mode as fingers are normal to the disc faces. Accordingly, a variable area comb octagonal BAW MEMS resonator oscillates at approximately 6.8 MHz which is that of a prior art BAW MEMS gyroscope in an octagonal configuration of similar dimensions such as depicted in FIG. 2.

Figure 20:
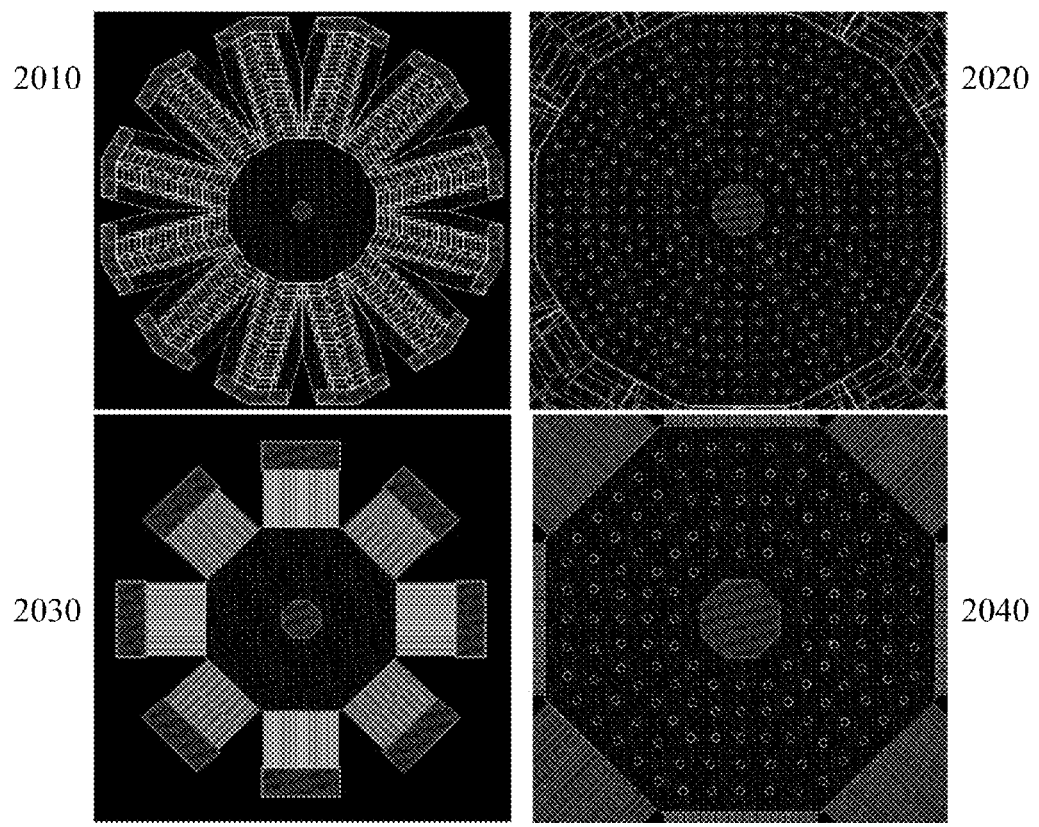
FIG. 20 depicts mask schematics for dodecagonal finger comb and octagonal variable area comb BAW MEMS gyroscopes according to embodiments of the invention together with release hole patterns for the bulk disc resonators.

FIG. 20 depicts first mask schematic 2010 for dodecagonal BAW MEMS gyroscope employing variable gap combs such as described above in respect of FIG. 14A. Second mask schematic 2020 depicts the resonator disc of the dodecagonal BAW MEMS gyroscope employing variable gap combs showing the 10 µm release holes which have been added in a symmetric manner together with the DC electrode pad in the centre. Third mask schematic 2030 depicts an octagonal BAW MEMS gyroscope employing variable area combs such as described above in respect of FIG. 19. Fourth mask schematic 2040 depicts the resonator disc of the octagonal BAW MEMS gyroscope employing variable area combs showing the 10 µm release holes which have been added in a symmetric manner together with the DC electrode pad in the centre. Accordingly, each of the dodecagonal BAW MEMS gyroscope employing variable gap combs and octagonal BAW MEMS gyroscope employing variable area combs are compatible with the commercially available low cost SOI-MEMS manufacturing processes such as described supra.

Figure 21:
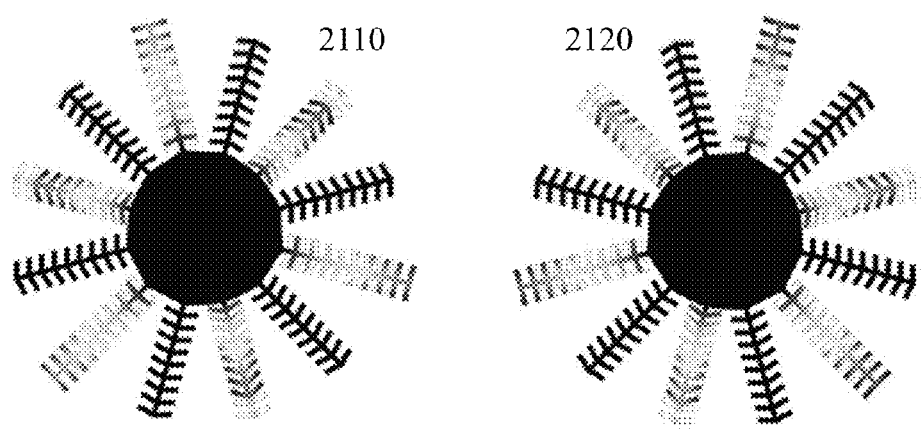
FIG. 21 depicts mode shapes of the drive and sense modes of the BAW MEMS gyroscope depicted in FIG. 15 obtained by finite element simulations.
Figure 22A:
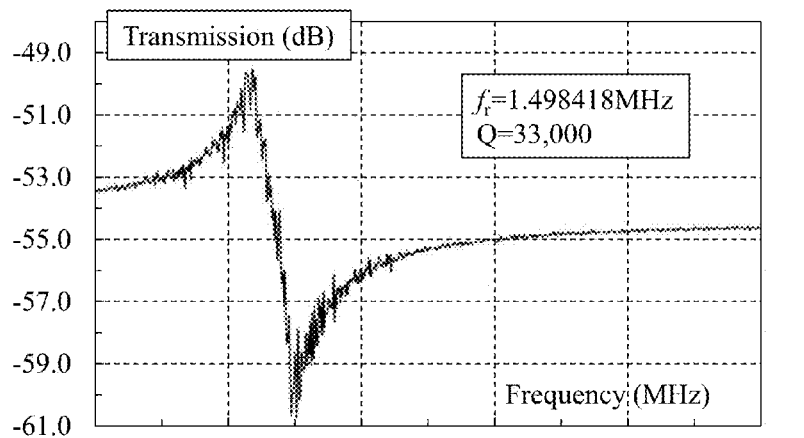
FIGS. 22A and 22B depict the measured resonance characteristics of the drive and sense modes respectively of the BAW MEMS gyroscope depicted in FIG. 15.
Figure 22B:
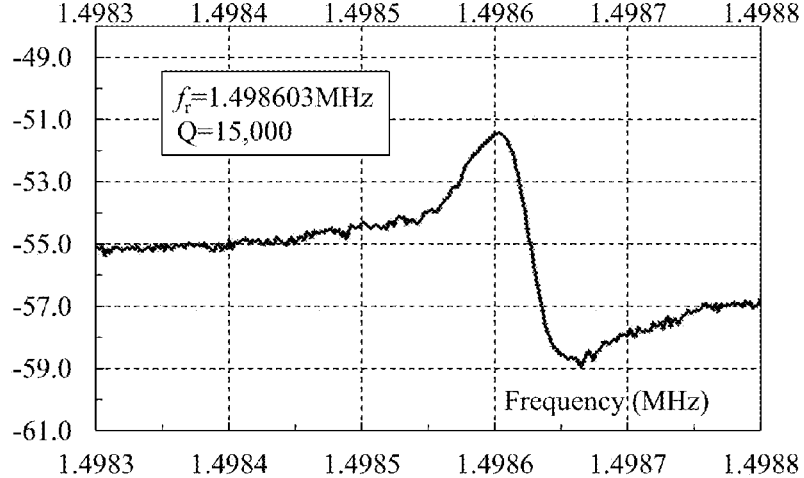

Referring to FIG. 21 there are depicted simulation results for the mode shapes of the drive and sense modes 2110 and 2120 respectively of a variable gap comb coupled dodecagonal BAW MEMS gyroscope such as depicted in FIG. 15 according to an embodiment of the invention. These simulation results being obtained by finite element modeling. The drive mode 2110 resonates at 1.499271 MHz and the sense mode 2120 resonates at 1.499543 MHz, an offset of 272 Hz. Now referring to FIG. 22A there is depicted the measured resonance characteristic for the drive mode of a fabricated variable gap comb coupled dodecagonal BAW MEMS gyroscope, according to the embodiment of the invention described above in respect of FIG. 15B, wherein the resonance frequency is 1.498418 MHz and the quality factor Q≈33,000. Similarly FIG. 22B depicts the sense mode resonance measured for the fabricated variable gap comb coupled dodecagonal BAW MEMS gyroscope wherein the resonant frequency is 1.498603 MHz and Q≈15,000. The resultant frequency offset between modes being 185 Hz. The resonance characteristics of the drive and sense modes depicted in FIG. 21 were measured under a vacuum level of approximately 10 mTorr.

Figure 23:
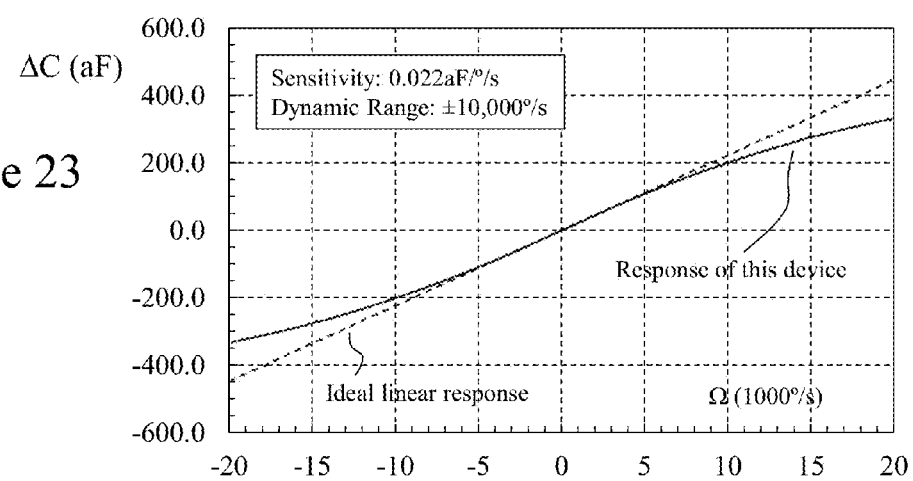
FIG. 23 depicts the simulated angular response per electrode for the BAW MEMS gyroscope depicted in FIGS. 16A and 16B.

FIG. 23 depicts the simulated angular rate response for the fabricated variable gap comb coupled dodecagonal BAW MEMS gyroscope according to an embodiment of the invention wherein the sensitivity is 0.022 aF/°/s and the dynamic range is ±10,000°/s. The variable gap comb coupled dodecagonal BAW MEMS gyroscope according to an embodiment of the invention is compared below in Table 1 with prior art BAW MEMS gyroscopes.

Figure 24A:
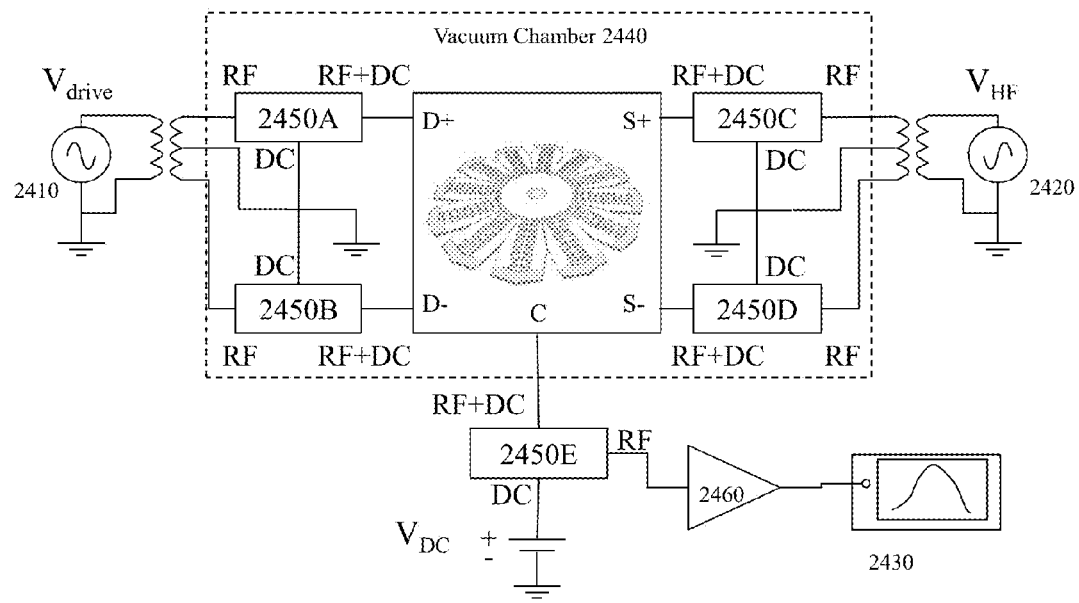
FIG. 24A depicts a schematic of an experimental test setup for testing BAW MEMS gyroscopes.
Figure 24B:
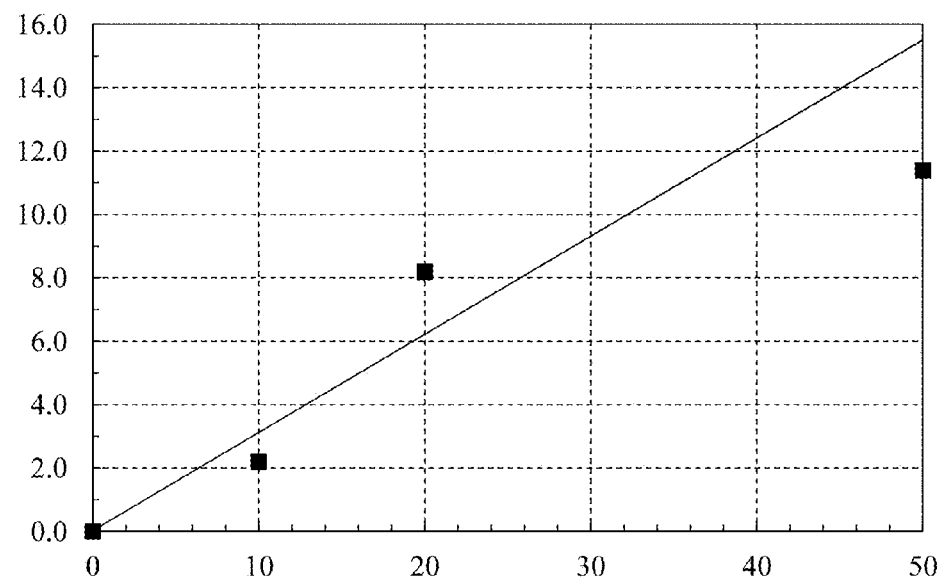
FIG. 24B depicts measured angular rate responses for a comb coupled BAW MEMS gyroscope according to an embodiment of the invention together with a linear approximation.

The angular rate response of the variable gap comb coupled dodecagonal BAW MEMS gyroscope presented supra in respect of FIGS. 22A and 22B together with measured angular rate measurements presented below in respect of FIG. 24B were measured under an approximately 10 mTorr vacuum level using the test setup depicted in the system schematic of FIG. 24A. The vacuum chamber 2440 was fixed on top of a rate table, not shown for clarity. First to fourth bias tees 2450A to 2450D are used to apply the DC voltages required by the drive and sense electrodes. A fifth bias tee 2450E is coupled to the output to a high gain transimpedance amplifier 2460 in order to amplify the gyroscopes output signal current to the test measurement system 2430. The high frequency signal ($V_{HF}$) was used to modulate the output signal of the gyroscope to a higher frequency, in order to separate it from any feed-through from the drive signal utilizing a mixing configuration similar to that employed by Clark et al in "High Q UHF Micromechanical Radial-Contour Mode Disk Resonators" (J. MEMS, Vol. 14(6), pp. 198-1310) and Wang et al in "1.156 GHz Self-Aligned Vibrating Micromechanical Disk Resonator" (IEEE Trans. Ultrasonics, Ferroelectrics, and Frequency Control, Vol. 51(12), pp. 1607-1628). Measurements were limited below 50°/sec angular rate input due to the mechanical limitations of the system depicted in FIG. 24A. The rate sensitivity was measured to be 0.31 μV/°/sec, corresponding to a capacitance sensitivity of 0.43 aF/°/sec/electrode. The resulting measured angular rate response is shown in FIG. 24B.

pattern of release holes may be removed partially or completely. Alternatively as the release hole pattern may be asymmetric or designed to enhance coupling between drive and sense modes rather than addressing potential frequency splitting of resonant modes of the disc.

According to another embodiment of the invention a comb coupled BAW MEMS gyroscope according to embodiments of the invention such as described supra in respect of FIGS. 10 through 24B may be formed without an HF post-processing step for BOX etching and release as trenches may be etched below the structure thereby releasing the resonator. Referring to FIG. 25A there is depicted a mask layout for a comb coupled BAW MEMS gyroscope according to an embodiment of the invention wherein the combs

TABLE 2

Comparison between Comb Coupled BAW MEMS Gyroscope according to Embodiment of the Invention with Prior Art BAW MEMS Gyroscopes

|  | Elsayed | Johari1 | Johari2 | Sung | Variable Gap Comb Coupled Dodecagonal (Invention) | |
|---|---|---|---|---|---|---|
| Diameter (mm) | 0.73 | 0.8 | 1.2 | 1.12 | 2.13 | |
| Gap (μm) | 3 | 0.25 | 0.18 | 0.2 | 3 | |
| Thickness (μm) | 25 | 50 | 35 | 60 | 25 | |
| f (MHz) | 8.14 | 5.88 | 2.917 | 3.12 | Simulation | Measured |
|  |  |  |  |  | Drive | Drive |
|  |  |  |  |  | 1.499271 | 1.498418 |
|  |  |  |  |  | Sense | Sense |
|  |  |  |  |  | 1.499543 | 1.498603 |
| Q (,000) | 10 | 12 | 66 | 1 | 33 (Drive) | 15 (Sense) |
| Rate Sensitivity per Electrode (aF/°/s) | 0.002 | — | 4.367 | — | 0.022 | |
| Dynamic Range (°/s) | 2,000 | Limited to 100 in Measurements | | 30,000 | 10,000 | |

Elsayed = Elsayed et al "A 2000°/s Dynamic Range Bulk Mode Dodecagon Gyro for a Commercial SOI Technology" (Proc. IEEE Intl. Conf. Electronics, Circuits, & Systems, 2011, pp.264-267).
Johari1 = Johari et al "Capacitive Bulk Acoustic Wave Silicon Disk Gyroscopes", (Proc. IEEE Electron Devices Meeting, 2006, pp.1-4).
Johari2 = Johari et al "High Frequency Capacitive Disk Gyroscopes in (100) and (111) Silicon"(Proc. IEEE Conf. on MEMS, 2007, pp.47-50).
Sung = Sung et al "A 3 MHz Spoke Gyroscope with Wide Bandwidth and Large Dynamic Range" (Proc. IEEE Conf. on MEMS, 2010, pp.104-107).

Within the prior art and embodiments of the invention described above in respect of FIGS. 10A through 24B the resonant discs are supported with a central mount formed by an HF timed release step at a predetermined point so that the BOX layer is not completely etched away under the resonator disc, such as depicted in FIG. 6 for example. However, with variable area comb and variable gap comb coupled resonator discs the central resonator disc portion may be supported by the combs directly removing the requirement for the central support in the resonator. Accordingly, in manufacturing process flows according to embodiments of the invention with an HF etching step for the release, such as for example etching the BOX layer of an SOI wafer within which the BAW MEMS gyroscope according to embodiments of the invention is fabricated, the timing of the HF etch is now not critically timed.

It would therefore be evident to one skilled in the art that the dimensions and structure of the disc may now be established from the coupling between drive and sense modes rather than any consideration of the disc's resonance or central support. Accordingly, the solid disc with symmetric release apertures may become a ring structure, ring and spoke structure, and polygonally shaped such as octagonal, decagonal, and dodecagonal for example. Further, as the release process has been made robust and not time sensitive it would be evident that according to the design of the disc, etching process, and sensitivities of other elements that the anchored at the drive/sense electrodes and they anchor at the resonator disc vertices the resonator disc which is freely suspended over the substrate as a result of the comb structures. Now referring to FIG. 25B there is depicted the simulated mode shape for the comb suspended BAW MEMS gyroscope according to an embodiment of the invention. In FIG. 25B comb-substrate connections 2510 are evident one end of the comb structures 2530 as well as comb-disc connections 2520 at the other end of the comb structures 2530. Table 3 below presents the simulation results for comb suspended BAW MEMS gyroscopes according to embodiments of the invention.

TABLE 3

Comparison between Prior Art Centre Mounted and Inventive Comb Coupled BAW MEMS Gyroscopes

| Type | No. of Fingers | Support Type | Diameter (mm) | F (MHz) | Rate Sensitivity (aF/°/s) | Dynamic Range (°/s) |
|---|---|---|---|---|---|---|
| Prior Art | 0 | Centre | 0.73 | 7.3 | 0.0036 | ~2,000 |
| Inventive 1 | 10 | Centre | 0.50 | 1.7 | 0.0125 | ~15,000 |
| Inventive 2 | 10 | Vertices | 1.0 | 3.2 | 0.0254 | ~15,000 |

Within the preceding descriptions of the prior art and embodiments of the inventions relating to BAW MEMS gyroscopes the manufacturing platform has been primarily considered as being one exploiting silicon-on-insulator wafer geometries for compatibility with commercial SOI-MEMS manufacturing sequences. However, it would be evident to one skilled in the art that other materials may be employed including polysilicon and silicon as well as other structural materials as evident from FIG. 26 wherein a material selection chart for MEMS device implementations is depicted. Plotted onto the material selection chart are a range of different materials including metals, dielectrics, ceramics and polymers. Each material being represented by a point on the X-Y graph wherein the X-axis is density and Young's modulus is the Y-axis. The data being plotted is according to the work of V. T. Srikar et al "Materials Selection in Micro-Mechanical Design: An Application of the Ashby Approach" (J. Microelectromechanical Systems Vol. 10, No. 1, pp. 3-10).

As evident from the material selection chart, different types of materials tend to be grouped together. Ceramic materials 2640 tending to appear in the top left, metals 2650 appearing in the middle-right, whilst polymers and elastomers 2620 are grouped together in the bottom-left. The trend arrow 2610 indicates the direction of preference for selecting materials for MEMS application in having high Young's modulus and low density materials is preferable. Accordingly, silicon carbide (SiC), alumina ($Al_2O_3$) and diamond (C) offer better alternatives to Si whilst silicon nitride ($Si_3N_4$) and aluminium nitride (AlN) also offer suitable alternatives. SiC represents an interesting choice since the required processing technology is more mature. Additionally SiC offers an increased hardness when compared with silicon, a hardness of 9 mohs versus 6.5 mohs. The increased hardness providing increased lifetime for MEMS elements such as gears, motors, translation drives, etc. Also, SiC's high elastic modulus allows for higher resonant frequencies, hence enabling higher frequency operation of devices such as micro-mirrors or accelerometers, and yielding better actuation and sensing performance.

However, as noted even for Si which is a very mature technology, available processes are not necessarily compatible for monolithically integrated CMOS-MEMS circuits. In many instances SOI MEMS processes whilst exploiting SOI CMOS processing steps and sequences these require thermal processing budgets that do not allow for either the MEMS to be formed after manufacturing of the CMOS or the MEMS to be fabricated atop the CMOS electronics in order to reduce die footprint and in many instances CMOS-MEMS interconnection complexity and/or parasitics. Additionally, special materials and contamination arising from MEMS wet etching processes may impact the provisioning of CMOS-MEMS combinations with a single process flow.

Accordingly general prior art and commercially accessible MEMS foundry processes tend to be discrete and standalone processes, such as Robert Bosch's U.S. Pat. No. 5,937,275 "Method of Producing Acceleration Sensors", MEMSCAP's "Multi-User MEMS Processes" (MUMPs®), MEMSCAP'S family of PolyMUMPs™, MetalMUMPs™ and SOIMUMPs™, and Sandia's Ultra-planar Multi-level MEMS Technology 5 (SUMMiT V™). Other processes allow MEMS fabrication prior to CMOS including for example Analog Devices' MOD-MEMS Sandia's iMEMS and IMEC's Si—Ge processes are typically MEMS after CMOS. Further DALSA Semiconductor have a highly publicized "low temperature" micro-machining with silicon dioxide process, see L. Ouellet et al in U.S. Pat. No. 7,160,752 entitled "Fabrication of Advanced Silicon-Based MEMS Devices" wherein processing temperatures are between 520° C. and 570° C. to be just below the temperature of eutectic formation temperature of the Al—Si—Cu interconnects.

Low temperature SiC processing techniques have been described by the inventors in U.S. Pat. No. 8,071,411 entitled "Low Temperature Ceramic Microelectromechanical Structures," U.S. Patent Applications 2011/0,027,930 entitled "Low Temperature Wafer Level Processing for MEMS Devices" and 2011/0,111,545 entitled "Low Temperature Ceramic Microelectromechanical Structures" and research publications including "Low-Stress, CMOS-Compatible Silicon Carbide Surface Micromachining Technology Part-I: Process Development and Characterization" (J. MEM Systems, Vol. 20, pp 720-729) and "Low-Stress, CMOS-Compatible Silicon Carbide Surface Micromachining Technology Part-II: Beam Resonators for MEMS Above-IC" (J. MEM Systems, Vol. 20, pp 730-744). The process outlined provides SiC structures wherein metallization may be formed on the upper surface of the SiC, the lower surface of the SiC, and one or both vertical surfaces. Accordingly, metallized SiC structures may be employed to form elements of the BAW MEMS gyroscopes according to embodiments of the invention described above in respect of FIGS. 10A through 25B and below in respect of FIGS. 27A through 29 including the resonator disc and comb structures for anchoring in one or more locations and electrostatic actuation.

Figure 27A:
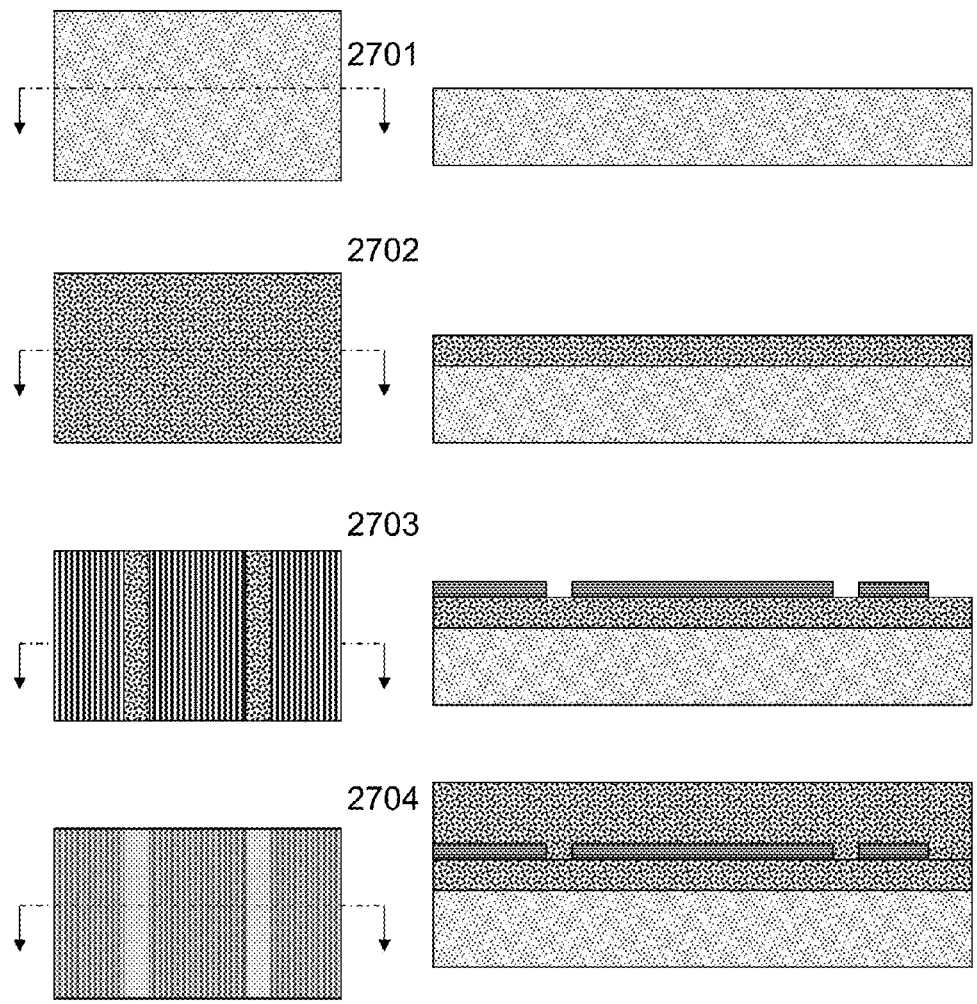
FIGS. 27A through 27C depicts a process flow according to an embodiment of the invention for providing low temperature ceramic structural elements with vertical sidewall metallization for BAW MEMS gyroscopes according to embodiments of the invention.

Now referring to FIG. 27A the initial process steps are shown in plan and cross-sectional views 2700A. In first step 2701 a silicon wafer 2710 is provided, the silicon wafer 2710 may contain CMOS electronics or it may not, and coated with metallization, such as aluminum (Metal1) 2730. The metallization allowing the electrical interconnection of MEMS elements such as shown supra in respect of lower metallization 4111 without recourse to air bridges and other complex electrical interconnects from prior art processes that do not support metallization beneath the structural layers of the MEMS device. Whilst shown as a blanket deposition in step 2701 this may be a deposition and patterning step such that the metallization provides the required electrical interconnection pattern for the MEMS device.

The aluminum (Metal1) 2730 being deposited directly where the silicon wafer 2710 is a processed CMOS substrate and hence there is present a passivation or planarization layer such as phosphosilicate glass, silicon oxide, or nitride. Optionally a 2.5 µm layer of silicon dioxide 2720 to reduce electrical feed-through from the electrical interconnects of the MEMS structure to the Si CMOS within the silicon wafer 2710 may be applied prior to the metallization in step 2701. Next in step 2702 the metalized silicon wafer is coated with a 0.5 µm layer of polyimide 2740. The 0.5 µm polyimide layer 2740 being the sacrificial layer to release the MEMS structure as finally formed.

On top of the sacrificial polyimide layer 2740 a further 2 µm spin-on polyimide layer is deposited in step 2703 and patterned in step 2704 by the deposition of an etch mask. The etch mask allowing the patterning of the 2 µm polyimide studs in step 2705 that will ultimately be removed to form the lateral gaps between the MEMS elements. The etch mask may be a metal, such as chromium 2760, photoresist or another material providing the desired selectivity of etch between the polyimide and itself.

Figure 27B:
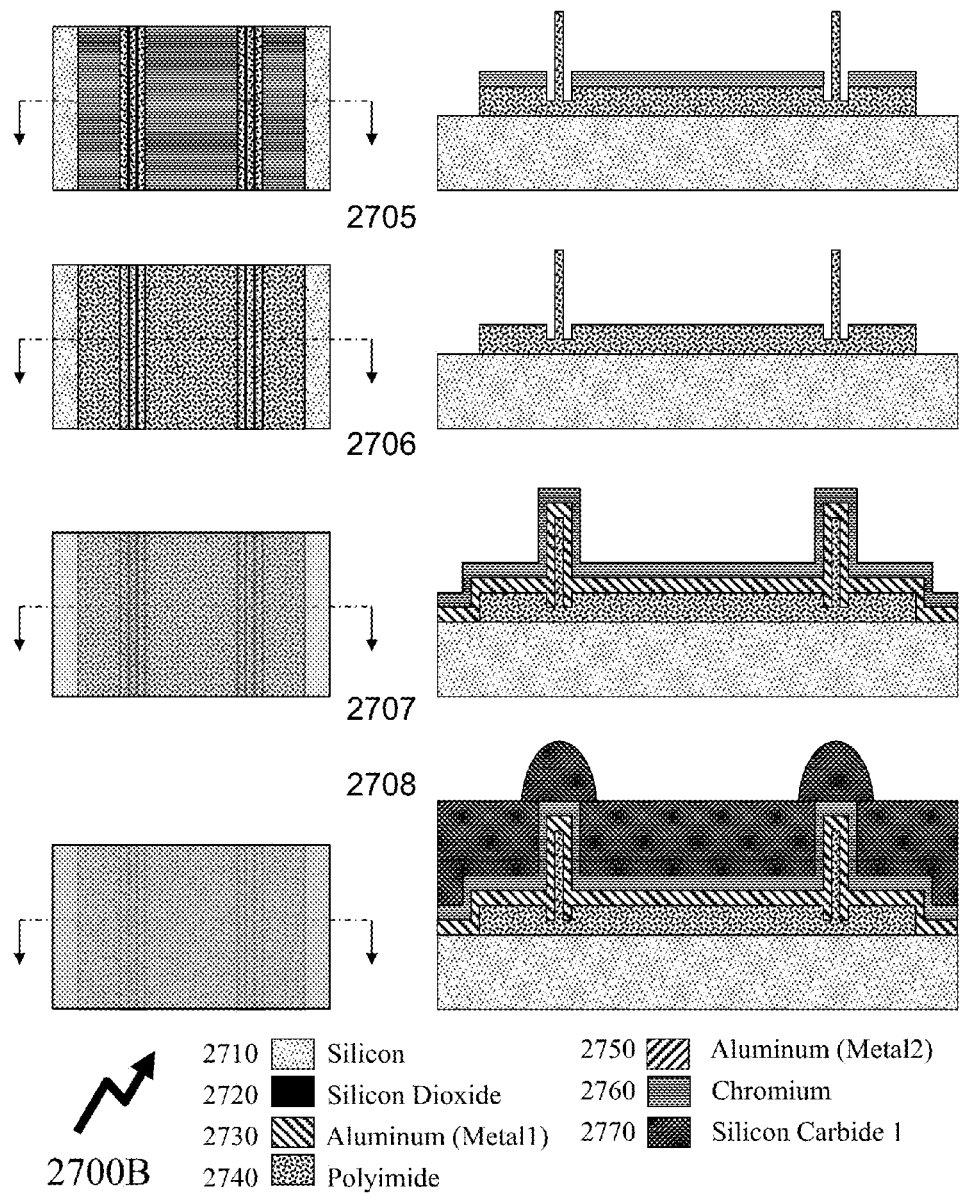

Now referring to FIG. 27B at step 2706 the initial 0.5 µm polyimide 2740 is patterned and etched to provide the anchors for the MEMS elements, the anchors being those regions wherein the MEMS structure is attached to the silicon wafer 2710. Next at step 2707 a 60 nm aluminum 2730 layer (Metal1) is deposited across the entire wafer surface forming the bottom and lateral structural interconnect, and the adhesion layer for the anchors, and is capped with an 80 nm chromium 2760 layer which will act as the etch stop for the silicon carbide (SiC1) 2770 MEMS structural layer. Accordingly in step 2708 a 2 μm SiC1 2770 layer is deposited. In step 2709 this is patterned leaving regions around the studs exposed. This region is then etched in step 2709 to expose the 60 nm chromium 2760/80 nm aluminum 2730 (metal1 atop the 2 μm polyimide 2740 studs.

Figure 27C:
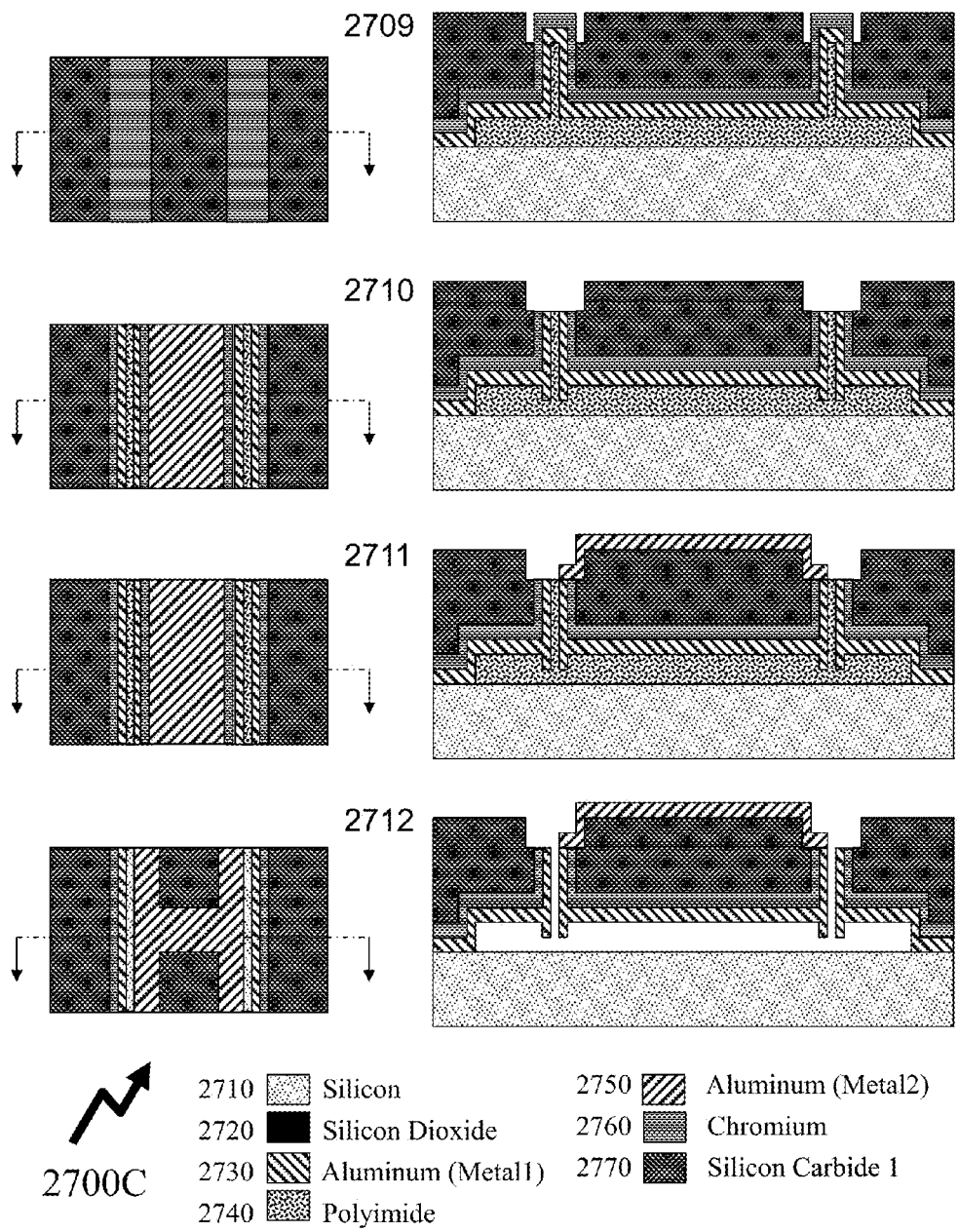

Referring now to FIG. 27C there is shown the next step 2710 wherein these thin films atop the 2 μm polyimide 2740 studs are etched back sufficiently to expose the top of the studs. Accordingly at this point the elements of the MEMS structure are isolated one from another as there is now no continuous SiC1 2770 film bridging over the polyimide 2740 studs. In step 2711 the SiC1 2770 is patterned with metallization for electrical interconnects, heaters, and other electrical structures according to the requirements of the MEMS devices being fabricated. Finally at step 2712 the polyimide 2740 is etched thereby releasing the MEMS structures, whereby the lateral gaps are formed where the polyimide 2740 studs were provided in the first steps at step 2705. The MEMS structures being anchored at the anchor regions defined within step 2706.

Optionally the metallization deposited in step 2701 allowing the formation of electrical interconnects beneath the MEMS structure may be omitted. Alternatively the metallization used may be other than aluminum (Metal1) according to the design requirements of the MEMS device and performance requirements, other metallizations including for example chromium, gold (Au), titanium (Ti), platinum (Pt), and TiPtAu.

Figure 28A:
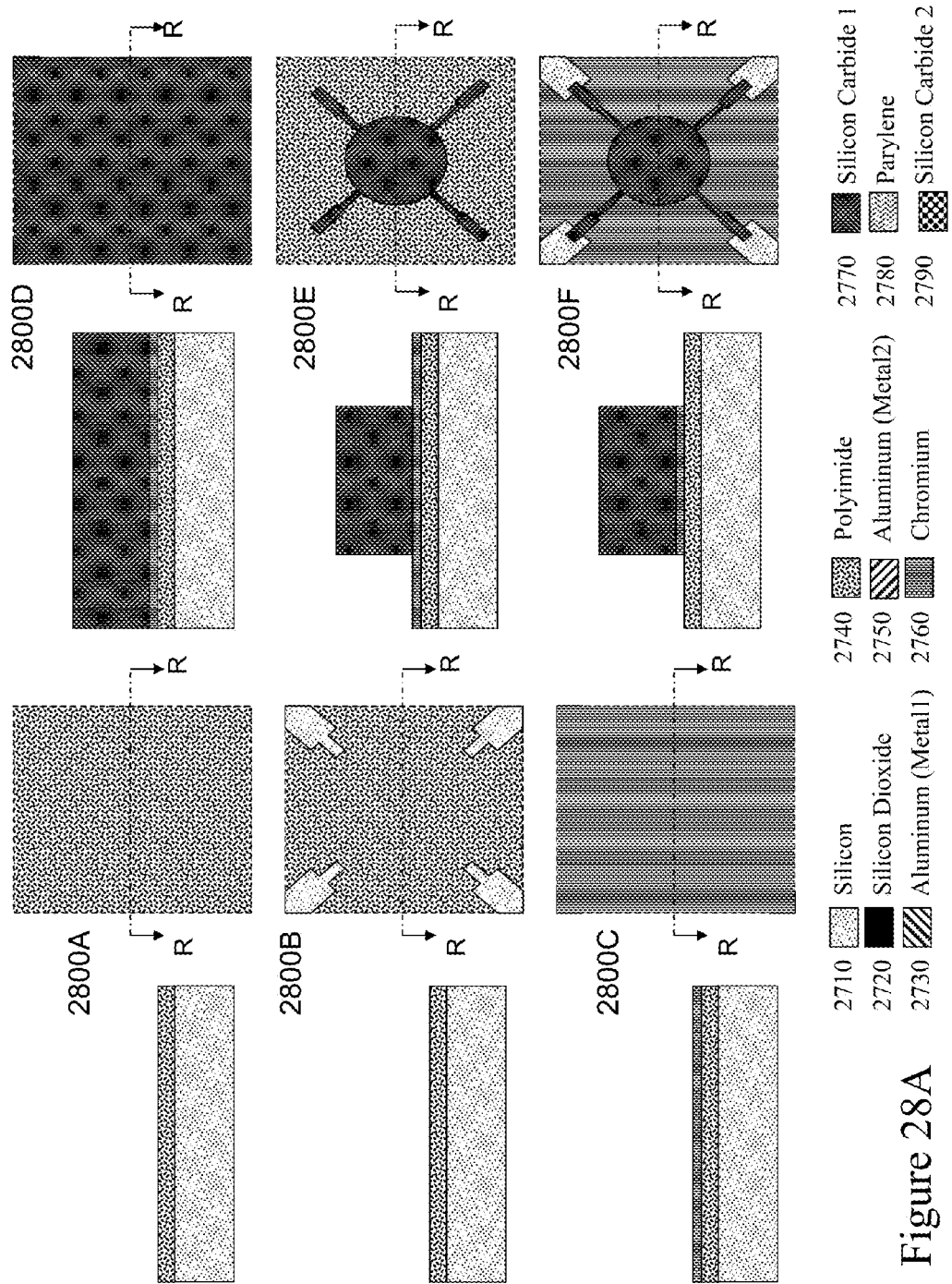
FIGS. 28A through 28C depicts a process flow according to an embodiment of the invention for providing low temperature ceramic structural elements with vertical sidewall metallization for BAW MEMS gyroscopes according to embodiments of the invention.
Figure 28B:
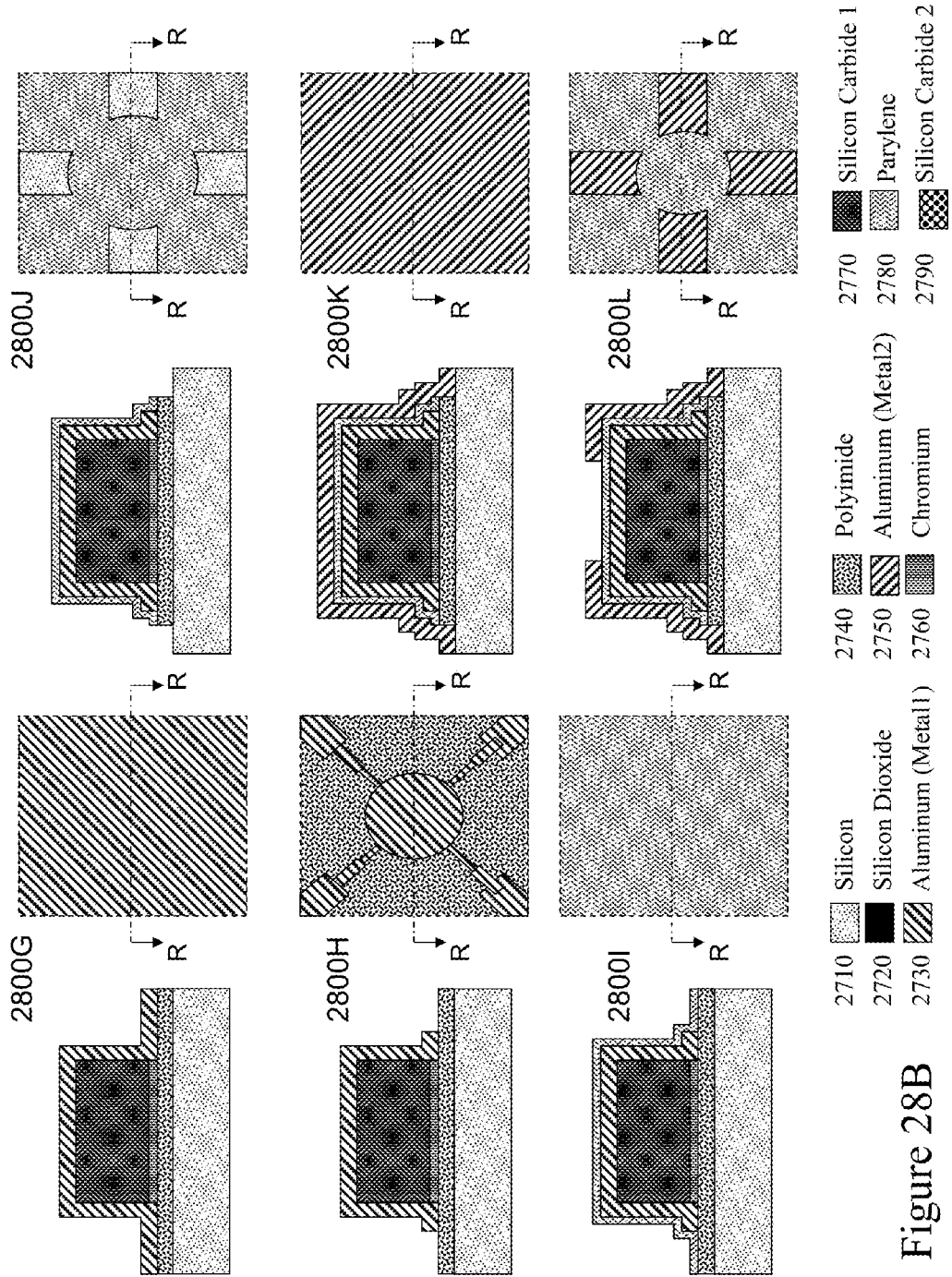
Figure 28C:
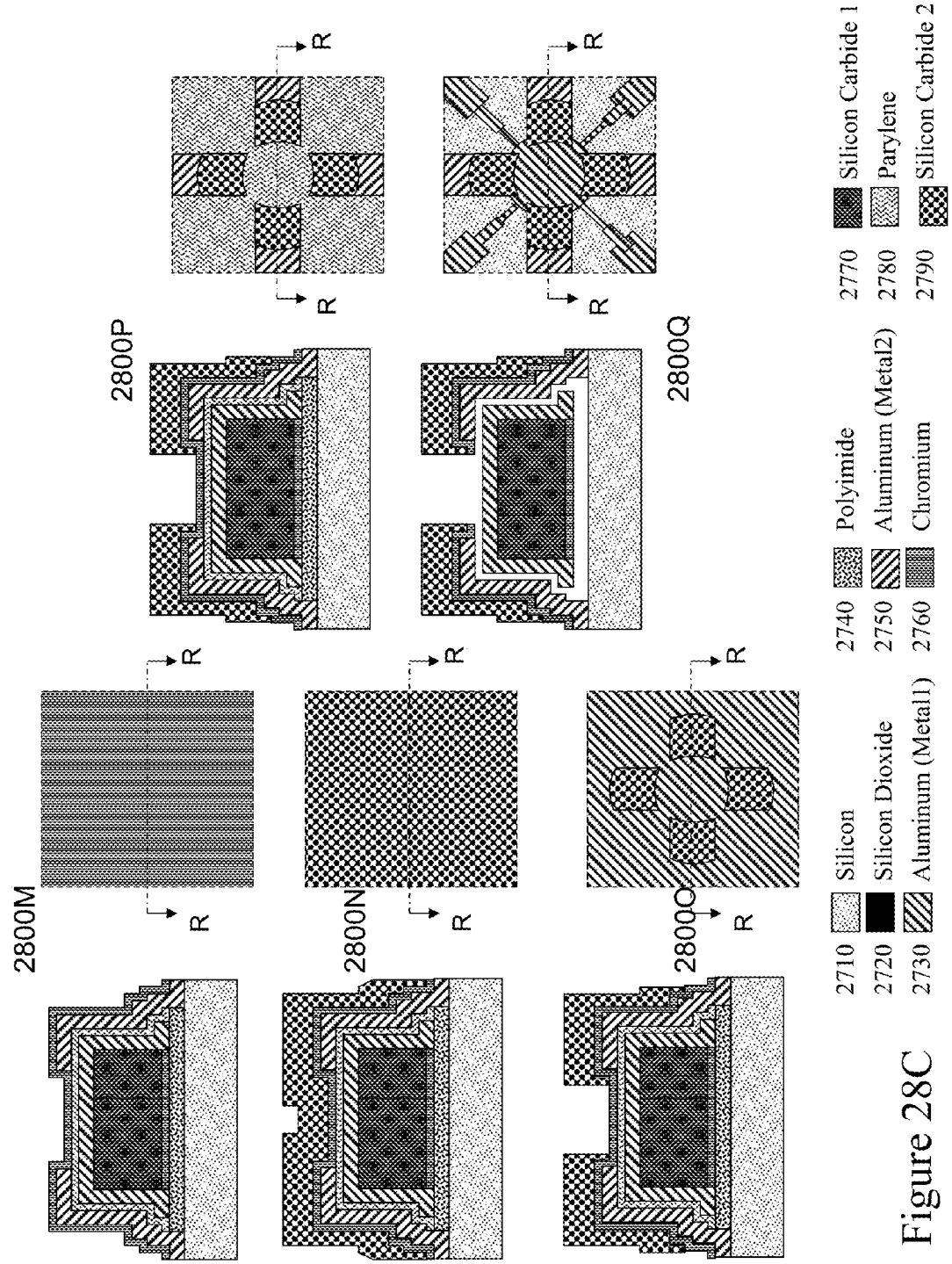

Now referring to FIGS. 28A through 28C there is illustrated an exemplary process flow for a reinforced MEMS resonator on Si CMOS according to an embodiment of the invention using two sacrificial materials and two structural materials. This process being shown plan and cross-sectional views, the first step in 2800A of FIG. 28A, wherein the cross-sectional view is along section line R-R. In first step 2800A a silicon wafer 2810 which may contain CMOS electronics or it may not, is coated with a nominal 0.5 μm layer of polyimide 2840, for example by a spin coating process, after which as shown in step 2800B it is patterned using a first photolithography step and an oxygen based RIE to form exposed disk anchor sites on the silicon 2810. Next in step 2800C the wafer is coated with approximately 80 nm barrier layer formed from chromium 2760. The chromium 2760 for example being deposited by DC sputtering.

Next as shown in step 2800D a first structural layer is deposited, by DC sputtering for example, of nominal thickness 2 μm and of SiC1 2770. This SiC1 2770 is then patterned in step 2800E using a NF3 based reactive ion etching (RIE) step with a second photolithographic process using a second mask to form the resonator disc and anchor arms. Subsequently in step 2800F the exposed barrier layer, being chromium 2860, is removed with a wet etch process. Next, as shown in FIG. 28B, step 2800G is performed wherein a first metallization is deposited, in this example by DC sputtering approximately 60 nm aluminum (Metal1) 2730. This first metallization is then patterned in step 2800H using a photolithography process with a third mask and a phosphoric-acetic-nitric (PAN) etch.

Next in step 2800I the wafer is coated with approximately 100 nm layer of parylene 2780. The parylene 2780 forming the second sacrificial material within the process, the first being the polyimide 2740 deposited in the first step 2800A. Parylene being the tradename for a variety of chemical vapor deposited poly(p-xylylene) polymers. Next in FIG. 28D step 2800J is shown wherein the parylene 2780 is processed using another photolithography step exploiting a fourth mask and an oxygen based RIE to expose the electrode anchors. At this point the second metallization is deposited, as shown in step 2800K, this being approximately 60 nm aluminum (Metal2) 2750, and then patterned in step 2800L using another PAN etch process. The aluminum (Metal2) 2750 having been patterned with another photolithography process exploiting a fifth mask.

Subsequently in step 2800M of FIG. 28C the wafer is coated with a further barrier of chromium 2860, approximately 80 nm thick, before a layer of second structural material, in this case 0.5 μm of silicon carbide 2 (SiC2) 2890, is deposited by low temperature PECVD in step 2800N. The second structural material is then patterned in step 2800O after a further photolithography step with a sixth mask and an NF3 RIE, thereby forming the reinforcement for the electrode structures with the SiC2 2890. Next in step 2800P the chromium 2860 barrier layer is removed using another CR-14S etching process thereby providing electrical isolation of the electrodes and completing all processing steps relating to the mechanical and electrical structure of the resonator.

All that remains in step 2800P is the removal of the first and second barrier layers, being polyimide 2840 and parylene 2880 respectively. This for example being achieved with an oxygen plasma based ashing process. In this final step therefore the resonator structure is released from the silicon 2810 and the electrode structures. It would be apparent to one of skill in the art that the process presented supra in respect of FIGS. 28A through 28C may alternatively employ a pair of structural ceramic materials, for example SiC1 2770 and silicon dioxide 2720, and/or a single sacrificial material, for example polyimide 2740.

It would be evident to one skilled in the art that the process flows described in FIGS. 27A through 27C and FIGS. 28A through 28C respectfully provide for SiC structures that are metallized on both vertical edges as well as lower surfaces in contrast to prior art MEMS manufacturing processes that are restricted to upper surfaces. These metallizations Metal1 2730 and Metal2 2750 may be connected to metallization traces in a third metallization layer Metal0 (not shown in the FIGS. 27A through 27C and FIGS. 28A through 28C respectfully) formed below the structure allowing different elements to be electrically addressed, grounded, and/or isolated according to the requirements of the design. Accordingly, the SiC structures may include the resonator disc as well as the electrostatically actuated variable gap or variable area comb coupling structures. Further, as outlined by the inventors in U.S. Pat. No. 8,071,411 and U.S. Patent Applications 2011/0,027,930 and 2011/0,111,545, these SiC structures may be fabricated directly above CMOS electronics as well as adjacent or partly covering to CMOS electronics. This being feasible as the maximum temperatures during the manufacturing process may be limited to 200° C., 250° C., 300° C., and 350° C. depending upon the thermal budget of the CMOS electronics.

It would be evident to one skilled in the art that the process flow in FIGS. 28A through 28C when compared to FIGS. 27A through 27C similarly provides for metallization on any surface of a structural element within the BAW MEMS gyroscopes according to embodiments of the invention. However, it also provides for structural elements and metallization on elements anchored to the substrate that whilst both have metallization facing each other on vertical surfaces they also have metallization facing each other on the upper side of the released structural element. As such in respect of a BAW MEMS gyroscope such as depicted in FIG. 8 the increased overlap provides for increased excitation and signal extraction.

Figure 29:
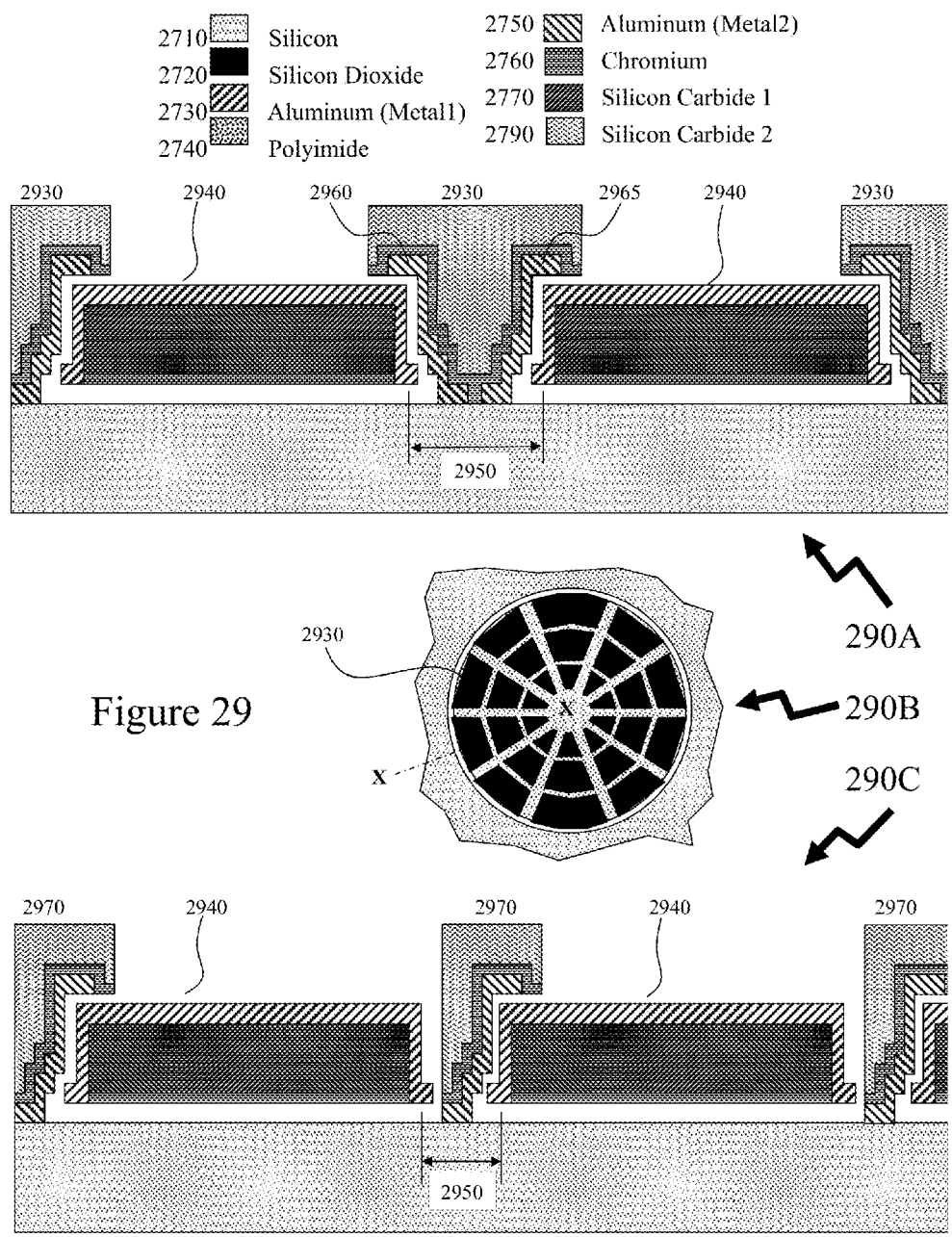
FIG. 29 depicts addition of excitation elements within the central region of a BAW MEMS gyroscope such as depicted in FIG. 8 according to an embodiment of the invention.
Figure 30:
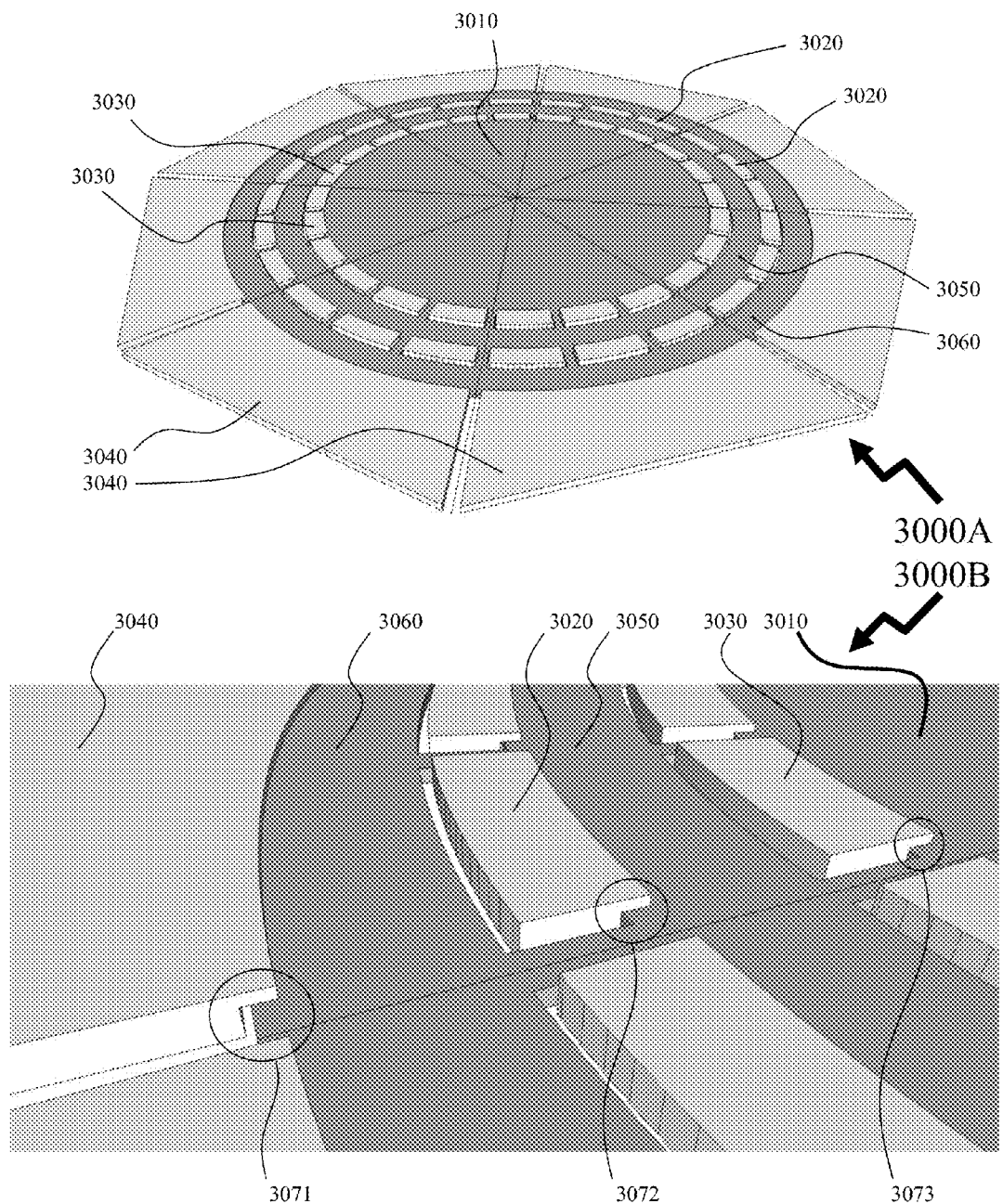
FIG. 30 depicts a 3D schematic of a BAW MEMS gyroscope and a zoomed 3D section according to an embodiment of the invention employing excitation elements.

As depicted in respect of FIG. 29 with first and second cross-sections 290A and 290C and plan view 290B metalized structural elements, such as may be formed for example through a manufacturing process flow as depicted in FIGS. 28A through 28C, may be deployed within the a ring and spoke BAW MEMS gyroscope as depicted supra in respect of FIG. 8 to provide excitation elements 2930 according to an embodiment of the invention. First and second cross-sections 290A and 290C being along Section X-X depicted in plan view 290B but only showing part of the section. Such internal excitation elements 2930 are also depicted in FIG. 30 by way of three-dimensional (3D) schematics. As depicted excitation elements 2930 are deployed within openings 2950 in the central region of the disc 2940 in addition to the drive elements. Optionally additional excitation elements 2930 may be employed at the periphery of the disc 2940 of the resonator.

Within first cross-section 2900A the excitation elements 2930 are implemented in a manner that they are active upon both sides with first and second excitation electrodes 2960 and 2965 respectively such that they excite the disc 2940. As depicted the excitation elements 2930 employ a second ceramic layer (SiC2) 2790 although it would be evident that other ceramics compatible with manufacturing processes described supra may be employed. As with FIGS. 27A through 28C respectively the structures in FIG. 29 may be implemented such that the metallizations Metal1 2730 and Metal2 2750 may be connected to metallization traces in a third metallization layer Metal0 (not shown for clarity) formed below the structure allowing different elements to be electrically addressed, grounded, and/or isolated according to the requirements of the design. Accordingly first and second electrodes 2960 and 2965 may be driven with different electrical signals or the same electrical signal according to the excitation requirements for the disc 2940. Within second cross-section 2900B the excitation elements 2970 employ only single sided excitation of the disc 2940, in this instance towards the outer edge of each opening within the disc 2940. It would be evident that alternatively the excitation elements 2970 may engage towards the inner edge of each opening within the disc 2940.

Now referring to FIG. 30 there are depicted a 3D schematic 3000A and a zoomed 3D section 3000B of a BAW MEMS gyroscope according to an embodiment of the invention employing excitation elements such as described above in respect of FIGS. 27A through 29 respectively. Accordingly in 3D schematic 3000A the central disc 3010 is depicted together with first and second outer regions 3050 and 3060 respectively wherein these are defined by the pattern of first and second excitation elements 3020 and 3030 respectively into first and second rings. Also patterned at the outer edge of the resonating disc are outer electrodes 3040. As depicted the outer electrodes 3040 have octagonal symmetry whilst each of the first and second rings comprise 24 first and second excitation elements 3020 and 3030 respectively.

Within zoomed 3D schematic 3000B the outer electrode 3040, first and second outer regions 3050 and 3060 respectively, and first and second excitation elements 3020 and 3030 respectively are shown wherein the overhang of the first and second excitation elements 3020 and 3030 respectively and outer electrode 3040 to the disc 3010 can be seen in first to third regions 3072, 3073, and 3071 respectively.

Figure 31:
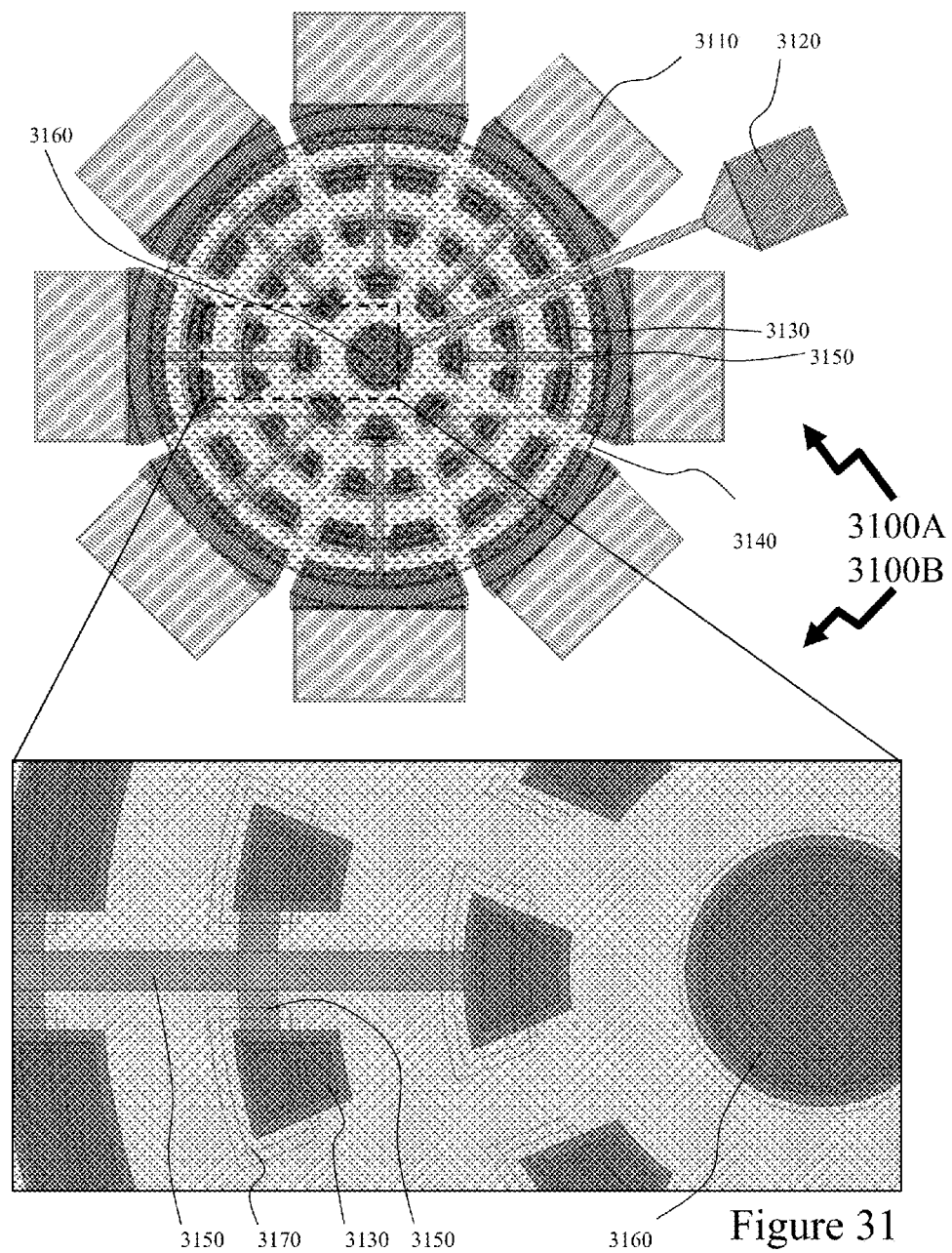
FIG. 31 depicts a mask set overlay schematic and a zoomed section of the same mask set overlay for a BAW MEMS gyroscope according to an embodiment of the invention as depicted in FIG. 30.

Now referring to FIG. 31 there is depicted a mask set overlay schematic 3100A and a zoomed mask set overlay 3100B of the same mask set overlay for a BAW MEMS gyroscope according to an embodiment of the invention as depicted in FIG. 30. At the edges of the mask set overlay schematic 3100A are the 8 edge elements 3110 corresponding to the outer electrodes 3040 of the BAW MEMS gyroscope according to an embodiment of the invention in FIG. 30 above as well as contact 3120 which connects to the centre 3160 of the BAW MEMS gyroscope 3140. Also depicted are excitation elements 3130 and electrical excitation traces 3150 which interconnect the excitation elements 3130 to the 8 edge elements 3110. These electrical excitation traces 3150 interconnecting to the excitation elements 3130 are depicted within the zoomed mask set overlay 3100B. Also evident in conjunction with each excitation element 3130 are the mask elements 3170 which correspond to the openings within BAW MEMS gyroscope 3140 with which the excitation elements 3140 are fabricated. It would be evident that the electrical excitation traces 3150 may be implemented in a metallization layer, for example Metal0, as described above.

Figure 32:
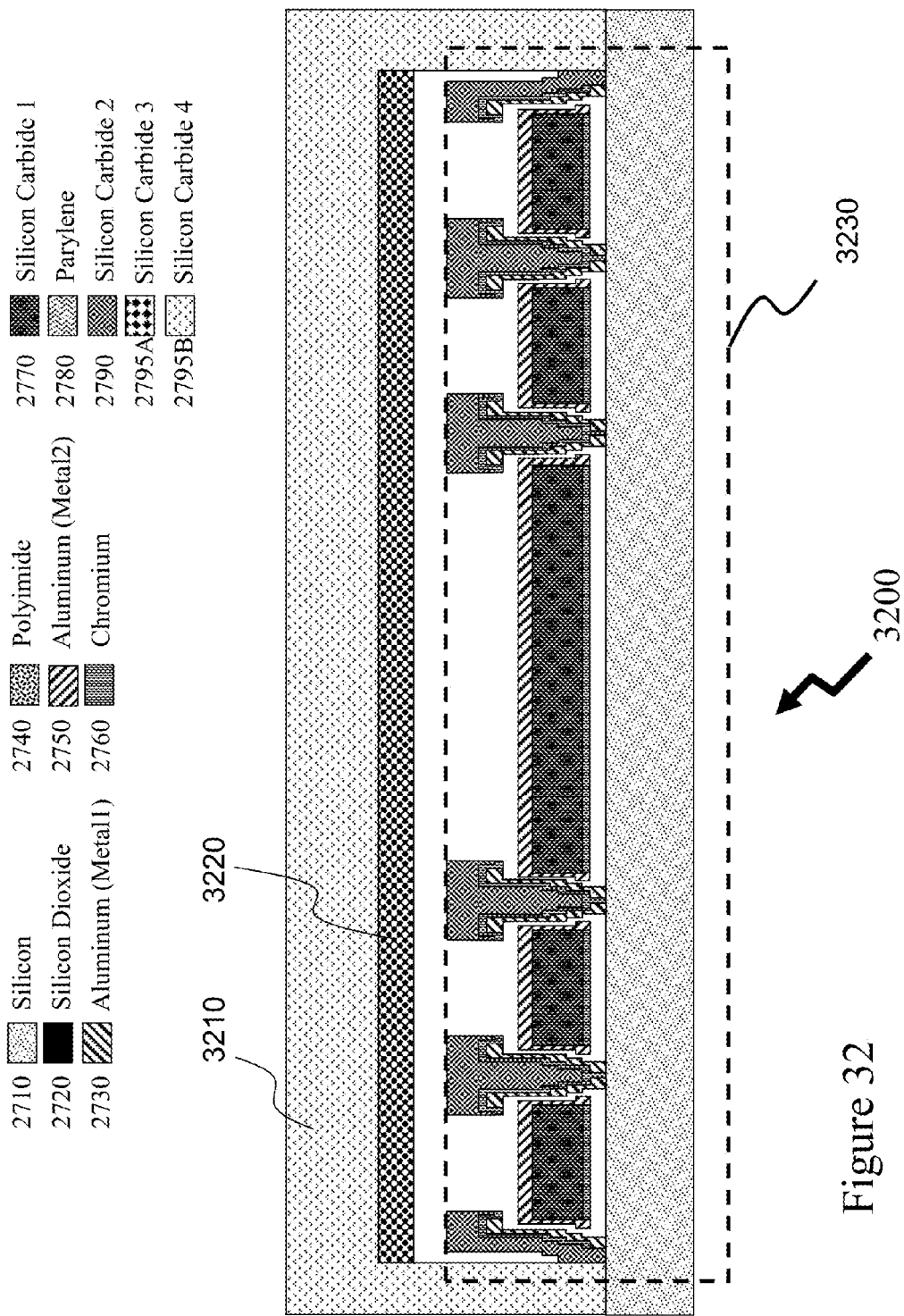
FIG. 32 depicts an encapsulated BAW MEMS gyroscope with excitation electrodes in cross-section such as depicted in FIG. 30 according to an embodiment of the invention.

Referring to FIG. 32 there is depicted an encapsulated BAW MEMS gyroscope 3200 in cross-section according to an embodiment of the invention. As depicted a BAW MEMS 3230, such as depicted supra in respect of FIGS. 29 through 31 respectively and manufactured according to exemplary process flows in FIGS. 27A through 28C respectively is encapsulated with a fourth ceramic layer, in this instance silicon carbide 4 (SiC4) 2795B, which has been deposited atop a patterned third ceramic layer, in this instance silicon carbide 3 (SiC3) 2795A. These third and fourth ceramic layers SiC3 2795A and SiC4 2795B respectively may be similarly deposited through low temperature deposition processes.

As such that the third ceramic layer 2795A may be deposited above a sacrificial material deposited atop the as fabricated BAW MEMS 3230 with mechanical connection to the Si 2710 substrate or an intermediate layer atop the Si 2710 substrate. Accordingly upon removal of the sacrificial layer the fourth ceramic layer SiC 2795B may be deposited thereby encapsulating the BAW MEMS 3230. Optionally, fourth ceramic layer SiC4 2795B may be replaced with another ceramic or an alternative encapsulation material such as parylene 2780 for example where rather than a hermetic or low leak rate seal a barrier with low permeability to gases is employed.

Within the descriptions presented supra in respect of FIG. 32 the excitation elements are coupled within each sector defined by the other electrodes. However, it electrostatically actuated MEMS structures would be evident that each excitation element may be discretely coupled to an electrical excitation source or that predetermined subsets of the excitation elements may be coupled in predetermined configuration such that one or more excitation signals with defined frequency and phase relationships to the drive excitation signal may be applied. Within the embodiments of the invention described supra in respect of FIGS. 29 through 32 the excitation elements are depicted and described as a structure comprising a ceramic support with metallization on the surfaces towards the body of the resonator structure and are depicted as being on one or both surfaces of the excitation element and may be coupled together or electrically isolated. As such these excitation elements, also referred to as internal electrodes as they are internally disposed within the body of the resonator structure, in conjunction with the resonator body act as capacitively coupled structures that electrostatically attract/repel the resonator body in response to the electrical potential of the excitation elements relative to the resonator body. Wherein metallization is provided on both surfaces of the excitation element, i.e. one towards the resonator centre and one towards the outer resonator edge, and these are isolated one may repel whilst another attracts. Alternatively, as depicted supra a single metallization may be provided on one surface only.

It would be evident that the removal of the central support and the provisioning of variable gap or variable area comb structures supporting the central disc may be combined with other BAW MEMS gyroscope designs including but not limited to the ring and spoke design operating in bulk acoustic and bulk flexural modes concurrently. It would be evident that the central vibratory element of the resonators described supra in respect of embodiments of the invention, commonly referred to as the disc, may be approximately circular or a multi-sided polygon although other geometries may be provided without departing from the scope of the invention.

In addition, it would be apparent to those skilled in the art that the aforementioned innovations according to embodiments of the invention may be applied to other electrostatically actuated MEMS structures wherein their geometry supports lateral motion in the same plane as the MEMS gyroscopes described above in respect of FIGS. 13A through 32. Example of such electrostatically actuated MEMS structures include, but are not limited to, bulk resonators, accelerometers, and lateral actuators.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
a substrate;
a central vibratory element; and
a plurality of electrostatic comb structures, each electrostatic comb structure anchored at one end to a predetermined portion of the central vibratory element and anchored at a second distal end to an electrode fabricated on the substrate and comprising a plurality of fingers; wherein
a first predetermined portion of the electrostatic comb structures comprise a predetermined portion of an excitation element to resonate the central vibratory element and a second predetermined portion of the electrostatic comb structures comprise a predetermined portion of a sensing element generating an output electrical signal in dependence upon the resonance of the central vibratory element.

2. The device according to claim 1, wherein
the electrostatic comb structures are metallized upon their sidewalls, the sidewalls being essentially perpendicular to the surface of a substrate on which the device is formed.

3. The device according to claim 1, wherein
the device is fabricated subsequent to the fabrication of a CMOS circuit within the substrate and covers a predetermined non-zero portion of the CMOS circuit, the device fabricated using a processing sequence that has a maximum processing temperature at least one of 200° C., 250° C., 300° C., or 350° C.

4. The device according to claim 1, wherein
the central vibratory element is a polyhedron designed to support resonant oscillation in a second order bulk mode for reduced frequency separation between a drive mode and a sense mode of the device, and
the spatial angular separation between the drive mode and the sense mode determines the number of sides to the polyhedron and the number of electrostatic comb structures.

5. The device according to claim 1, wherein
the electrostatic comb structures are at least one of variable gap or variable area.

6. The device according to claim 1, wherein
the central vibratory element and at least one electrostatic comb structure of a plurality of electrostatic comb structures are formed from a material selected from the group consisting of silicon, polysilicon, silicon carbide (SiC), alumina ($Al_2O_3$), diamond (C), silicon nitride ($Si_3N_4$), and aluminium nitride (AlN).

7. The device according to claim 1, wherein
each electrostatic comb structure comprises a comb spine along a radial line relative to the center of the central vibratory element and a plurality of pairs of fingers disposed along the comb spine, wherein
the fingers are either disposed parallel to the edge of the central vibratory element at each position around the central vibratory element or are perpendicular to the central spine.

8. The device according to claim 1, wherein
the plurality of electrostatic comb drives resonate at a first frequency;
the central vibratory element vibrates at a second frequency; and
the dimensions and structure of the central vibratory element are established such that the plurality of electrostatic comb drives are the main resonating structure and couples the drive and sense modes.

9. The device according to claim 1, wherein
the central vibratory element is a disc with apertures, wherein the apertures are employed within a processing step releasing the central vibratory element from the substrate.

10. The device according to claim 1, wherein the central vibratory element is a ring structure or a ring and spoke structure.

11. The device according to claim 1, wherein the central vibratory element is an even sided polygon; and the number of the plurality of electrostatic comb structures is equal to the number of sides of the even sided polygon.

12. The device according to claim 11, wherein the even sided polygon is one of an octagon, a decagon, or a dodecagon.

13. A device comprising:
a central vibratory element only coupled to a substrate via a plurality of electrostatic comb structures that are anchored at one end to a predetermined portion of the central vibratory element and anchored at a second distal end to an electrode fabricated on the substrate and comprising a plurality of fingers; wherein
a first predetermined portion of the electrostatic comb structures comprise a predetermined portion of an excitation element to resonate the central vibratory element and a second predetermined portion of the electrostatic comb structures comprise a predetermined portion of a sensing element generating an output electrical signal in dependence upon the resonance of the central vibratory element.

14. The device according to claim 13, wherein the electrostatic comb structures are metallized upon their sidewalls, the sidewalls being essentially perpendicular to the surface of a substrate on which the device is formed.

15. The device according to claim 13, wherein the device is fabricated subsequent to the fabrication of a CMOS circuit within the substrate and covers a predetermined non-zero portion of the CMOS circuit, the device fabricated using a processing sequence that has a maximum processing temperature at least one of 200° C., 250° C., 300° C., or 350° C.

16. The device according to claim 13, wherein the central vibratory element is a polyhedron designed to support resonant oscillation in a second order bulk mode for reduced frequency separation between a drive mode and a sense mode of the device; and
the spatial angular separation between the drive mode and the sense mode determines the number of sides to the polyhedron and the number of electrostatic comb structures.

17. The device according to claim 13, wherein the electrostatic comb structures are at least one of variable gap or variable area.

18. The device according to claim 13, wherein the central vibratory element is selected from the group consisting of a disc, a disc apertures, a ring structure, and a ring and spoke structure.

19. The device according to claim 13, wherein the central vibratory element is an even sided polygon; and
the number of the plurality of electrostatic comb structures is equal to the number of sides of the even sided polygon.

* * * * *